United States Patent
Ngo et al.

(10) Patent No.: US 11,323,288 B2
(45) Date of Patent: May 3, 2022

(54) SYSTEMS AND METHODS FOR SERVER CLUSTER NETWORK COMMUNICATION ACROSS THE PUBLIC INTERNET

(71) Applicant: DH2I COMPANY, Fort Collins, CO (US)

(72) Inventors: Thanh Q. Ngo, Oregon City, OR (US); Samuel Revitch, Portland, OR (US)

(73) Assignee: DH2I COMPANY, Fort Collins, CO (US)

( * ) Notice: Subject to any disclaimer, the term of this patent is extended or adjusted under 35 U.S.C. 154(b) by 39 days.

(21) Appl. No.: 16/532,677

(22) Filed: Aug. 6, 2019

(65) Prior Publication Data

US 2020/0053125 A1    Feb. 13, 2020

Related U.S. Application Data

(60) Provisional application No. 62/723,373, filed on Aug. 27, 2018, provisional application No. 62/717,194, (Continued)

(51) Int. Cl.
*H04L 12/46* (2006.01)
*H04L 29/06* (2006.01)
(Continued)

(52) U.S. Cl.
CPC .......... *H04L 12/4633* (2013.01); *G06F 9/547* (2013.01); *H04L 9/088* (2013.01); (Continued)

(58) Field of Classification Search
USPC .......... 726/14, 2, 21, 36; 713/150, 163, 181; 380/255, 264, 276
See application file for complete search history.

(56) References Cited

U.S. PATENT DOCUMENTS 7,992,201 B2 *  8/2011  Aldridge ............. H04L 63/0272
                                                726/14
8,020,203 B2 *  9/2011  Kumar .................... H04L 69/40
                                                709/239
(Continued)

FOREIGN PATENT DOCUMENTS

EP        3198464 A1     3/2016
WO    2016049609 A1     3/2016

OTHER PUBLICATIONS

Tschofenig, H., et al., "Transport Layer Security (TLS) / Datagram Transport Layer Security (DTLS) Profiles for the Internet of Things," Internet Engineering Task Force (IETF); ISSN 2070-1721; Jul. 2016; http://www.rfc-editor.org/info/rfc7925.

(Continued)

*Primary Examiner* — Sharif E Ullah
(74) *Attorney, Agent, or Firm* — Martensen IP; Michael C. Martensen

(57) ABSTRACT

Server cluster communication across the public internet using a single secure User Datagram Protocol (UDP) is facilitated by an intermediary registry server. The intermediary registry server enables servers within a cluster to identify and securely communicate with peer servers in the cluster across disparate locations and through firewalls Using an external address registry shared to each member of a server cluster peer group, individual servers can establish a direct secure channel using a single UDP tunnel.

22 Claims, 13 Drawing Sheets

Related U.S. Application Data filed on Aug. 10, 2018, provisional application No. 62/716,562, filed on Aug. 9, 2018, provisional application No. 62/715,361, filed on Aug. 7, 2018, provisional application No. 62/715,367, filed on Aug. 7, 2018.

(51) Int. Cl.

| | | |
|---|---|---|
| *H04L 69/326* | (2022.01) | |
| *H04L 69/16* | (2022.01) | |
| *H04L 9/08* | (2006.01) | |
| *G06F 9/54* | (2006.01) | |
| *H04L 12/66* | (2006.01) | |
| *H04L 67/10* | (2022.01) | |
| *H04L 67/141* | (2022.01) | |

(52) U.S. Cl.
CPC ............ *H04L 12/66* (2013.01); *H04L 63/029* (2013.01); *H04L 63/166* (2013.01); *H04L 67/10* (2013.01); *H04L 67/141* (2013.01); *H04L 69/16* (2013.01); *H04L 69/162* (2013.01); *H04L 69/326* (2013.01)

(56) References Cited

U.S. PATENT DOCUMENTS

| | | | |
|---|---|---|---|
| 8,234,702 B2 | 7/2012 | Maes | |
| 8,843,639 B2* | 9/2014 | Jewell | H04L 63/08 709/227 |
| 8,990,901 B2 | 3/2015 | Aravindakshan | |
| 9,037,709 B2 | 5/2015 | Enns | |
| 9,215,131 B2* | 12/2015 | Frey | H04L 41/0246 |
| 9,241,044 B2* | 1/2016 | Shribman | H04L 67/32 |
| 9,270,449 B1* | 2/2016 | Tribble | H04L 9/0827 |
| 9,342,293 B2 | 5/2016 | Enns | |
| 9,467,454 B2 | 10/2016 | Aravindakshan | |
| 9,577,909 B2 | 2/2017 | Li | |
| 9,577,927 B2 | 2/2017 | Hira | |
| 9,661,005 B2 | 5/2017 | Kamble | |
| 9,906,497 B2* | 2/2018 | Glazemakers | H04L 63/029 |
| 10,027,687 B2 | 7/2018 | Kamble | |
| 10,038,669 B2* | 7/2018 | Kizu | H04L 63/0227 |
| 10,348,767 B1* | 7/2019 | Lee | H04L 63/1433 |
| 10,382,401 B1* | 8/2019 | Lee | H04L 67/143 |
| 10,397,189 B1* | 8/2019 | Hashmi | H04L 63/1433 |
| 10,412,048 B2* | 9/2019 | Glazemakers | H04L 63/029 |
| 10,679,039 B2* | 6/2020 | Gallagher | G06V 40/166 |
| 2003/0088698 A1* | 5/2003 | Singh | H04L 12/4641 709/239 |
| 2004/0088385 A1* | 5/2004 | Blanchet | H04L 67/14 709/220 |
| 2005/0002412 A1* | 1/2005 | Sagfors | H04L 1/16 370/437 |
| 2005/0163061 A1* | 7/2005 | Piercey | H04L 67/1046 370/255 |
| 2006/0029016 A1* | 2/2006 | Peles | H04L 43/106 370/328 |
| 2006/0235939 A1* | 10/2006 | Yim | H04L 63/029 709/217 |
| 2006/0245373 A1* | 11/2006 | Bajic | H04W 8/12 370/254 |
| 2006/0268834 A1* | 11/2006 | Bajic | H04L 61/2007 370/352 |
| 2007/0002833 A1* | 1/2007 | Bajic | H04L 29/1282 370/352 |
| 2008/0045267 A1* | 2/2008 | Hind | H04L 51/14 455/557 |
| 2008/0072307 A1* | 3/2008 | Maes | H04L 67/28 726/12 |
| 2008/0144625 A1* | 6/2008 | Wu | H04L 45/306 370/392 |
| 2008/0291928 A1* | 11/2008 | Tadimeti | H04L 45/50 370/401 |
| 2008/0301799 A1* | 12/2008 | Arnold | G06F 21/6218 726/14 |
| 2009/0040926 A1* | 2/2009 | Li | H04L 67/1023 370/230.1 |
| 2009/0122990 A1* | 5/2009 | Gundavelli | H04L 63/164 380/278 |
| 2009/0138611 A1* | 5/2009 | Miao | H04L 29/12528 709/228 |
| 2009/0287955 A1* | 11/2009 | Matsumoto | H04L 12/4633 714/E11.113 |
| 2010/0125903 A1* | 5/2010 | Devarajan | H04L 63/102 709/224 |
| 2010/0161960 A1* | 6/2010 | Sadasivan | H04L 63/1408 713/152 |
| 2010/0246545 A1* | 9/2010 | Berzin | H04W 84/005 370/466 |
| 2011/0082941 A1* | 4/2011 | Kim | H04L 67/104 709/227 |
| 2011/0153793 A1* | 6/2011 | Tan | H04L 63/0272 709/222 |
| 2011/0202610 A1* | 8/2011 | Chaturvedi | H04L 29/12566 709/206 |
| 2012/0162445 A1* | 6/2012 | Kim | H04N 21/64322 348/207.1 |
| 2012/0166593 A1* | 6/2012 | Yoon | H04L 61/2553 709/219 |
| 2012/0226820 A1 | 9/2012 | Li | |
| 2013/0133043 A1* | 5/2013 | Barkie | H04L 63/0485 726/4 |
| 2013/0204988 A1* | 8/2013 | Grewal | H04L 67/28 709/221 |
| 2013/0283364 A1* | 10/2013 | Chang | G06F 9/45558 726/12 |
| 2013/0298201 A1* | 11/2013 | Aravindakshan | H04L 61/00 726/4 |
| 2014/0200013 A1* | 7/2014 | Enns | H04W 52/00 455/450 |
| 2014/0207854 A1 | 7/2014 | Enns | |
| 2014/0269774 A1* | 9/2014 | Callard | H04L 65/605 370/477 |
| 2015/0026262 A1* | 1/2015 | Chaturvedi | H04L 67/1061 709/204 |
| 2015/0188949 A1* | 7/2015 | Mahaffey | H04W 12/37 726/1 |
| 2015/0195293 A1* | 7/2015 | Kamble | H04L 63/1408 726/22 |
| 2015/0195684 A1* | 7/2015 | Lohmar | H04W 76/11 370/312 |
| 2015/0229649 A1 | 8/2015 | Aravindakshan | |
| 2015/0381484 A1* | 12/2015 | Hira | H04L 45/745 370/392 |
| 2016/0112372 A1* | 4/2016 | Katz | H04L 65/608 726/15 |
| 2016/0337104 A1* | 11/2016 | Kalligudd | H04L 5/0053 |
| 2017/0006034 A1* | 1/2017 | Link, II | H04L 63/029 |
| 2017/0134399 A1 | 5/2017 | Kamble | |
| 2017/0149548 A1* | 5/2017 | Mouhouche | H04L 5/0057 |
| 2017/0223063 A1* | 8/2017 | Herrero | H04L 65/1069 |
| 2017/0237708 A1* | 8/2017 | Klaghofer | H04L 67/02 726/12 |
| 2018/0026811 A1* | 1/2018 | Herrero | H04L 61/2007 370/352 |
| 2018/0054388 A1* | 2/2018 | Herrero | H04L 47/122 |
| 2018/0077267 A1* | 3/2018 | Bayer | H04L 43/087 |
| 2019/0089557 A1* | 3/2019 | Sung | H04L 45/245 |
| 2019/0182155 A1* | 6/2019 | Chang | H04L 45/741 |

OTHER PUBLICATIONS

PCT/US2019/045425; International Search Report and Written Opinion of the International Searching Authority; dated Oct. 24, 2019.
PCT/US2019/045431; International Search Report and the Written Opinion of the International Searching Authority; dated Oct. 28, 2019.

(56) References Cited

OTHER PUBLICATIONS

Reardon, Joel, et al.; "Improving Tor using a TCP-over-DTLS Tunnel"; May 25, 2009; http://www.cypherpunks.ca/~iang/pubs/TorTP.pdf (15 pages).
PCT/US2019/045430; International Search Report and Written Opinion of the International Searching Authority; dated Oct. 24, 2019.
PCT/US2019/048355; International Search Report and the Written Opinion of the International Searching Authority; dated Oct. 28, 2019.
Tan, J., et al.; "Optimiing Tunneled Grid Connectivity Across Firewalls"; CRPIT vol. 99, Grid Computing and e-Research 2009; Proc. 7th Australasian Symposium on Grid Computing and e-Research (AusGrid 2009), Wellington, New Zealand; pp. 21-28.
PCT/US2019/045425; International Preliminary Report on Patentability; The International Bureau of WIPO; dated Feb. 18, 2021.
PCT/US2019/045430; International Preliminary Report on Patentability; The International Bureau of WIPO; dated Feb. 18, 2021.
PCT/US2019/045431; International Preliminary Report on Patentability; The International Bureau of WIPO; dated Feb. 18, 2021.
PCT/US2019/048355; International Preliminary Reporton Patentability; The International Bureau of WIPO; dated Mar. 11, 2021.
"DH2i Launches DxOdessey for IoT, Edge-Optimized Software Defined Perimeter (SDP) Solution", Oct. 6, 2020 https://www.pmewswire.com/news-releases/dh2i-launches-dxodyssey-for-iot-edge-optimized-software-defined-perimeter-sdp-solution-301145871.html.

\* cited by examiner

SYSTEMS AND METHODS FOR SERVER CLUSTER NETWORK COMMUNICATION ACROSS THE PUBLIC INTERNET

RELATED APPLICATION

The present application relates to and claims the benefit of priority to U.S. Provisional Patent Application Nos. 62/715,361 filed 7 Aug. 2018, 62/715,367 filed 7 Aug. 2018, 62/716,562 filed 9 Aug. 2018, 62/717,194 filed 10 Aug. 2018, and 62/723,373 filed 27 Aug. 2018, all of which are hereby incorporated by reference in their entirety for all purposes as if fully set forth herein.

BACKGROUND OF THE INVENTION

Field of the Invention

Embodiments of the present invention relate, in general, to a system and method of communication between servers within a cluster of servers, and more particularly to a system and method of communication which may be operated with servers communicating over the public Internet.

Relevant Background

The Internet is a Wide Area Network (WAN) which is accessed via an Internet Service Provider or ISP. Internet Service Providers, along with cloud computing providers, are continually sparing in their allocation of rare public IPv4 network addresses. An IPv4 address is a 32-bit integer value. They are most often written in the dot-decimal notation, which consists of four octets of the address expressed individually in decimal numbers and separated by periods (for example, 11.22.333.444).

To enable all of these ISPs 125 and cloud computing companies and their clients to share the same IPv4 network addresses, and as shown in FIG. 1, an internal network or Local Area Network (LAN) 110 is connected to the public Internet 130 through a Network Address Translation ("NAT") router 120. The NAT router allows one IPv4 address, through which the router connects through an ISP to the Internet, to be shared between any number of internal devices by temporarily mapping a Transmission Control Protocol ("TCP") or User Datagram Protocol ("UDP") internal endpoint to the internal device wishing to communicate over the public Internet to a TCP or UDP external endpoint (also referred to herein as a port), respectively, on the externally accessible IPv4 address.

Aside from conserving public IPv4 network addresses, NAT routers also provide a basic level of security. While a NAT router will temporarily provide access to the Internet for devices within its respective LAN that wish to initiate traffic on the Internet, by default, it will not allow devices from the Internet to initiate traffic to devices within the LAN. This aspect (often referred to as a firewall) increases the complexity of configuring a network service that interacts through the Internet that sits behind a NAT router, such as a high availability server cluster.

A server cluster is a set of loosely or tightly connected computers that work together so that, in many respects, they can be viewed as a single system. The components of a cluster are usually connected to each other through LANs, with each node running its own instance of an operating system. Clusters are usually deployed to improve performance and availability over that of a single computer, while typically being much more cost-effective than single computers of comparable speed or availability. And since most clusters operate inside a LAN they can freely communication avoiding security concerns present with interaction of the public Internet.

Traditional clustering software is intended to be deployed on a well-controlled LANs for two reasons. First and expressed above, vendors consider software on a LAN to be secure or at least more secure than to provide direct access to their software or services over the public Internet. Second, Individual layer-4 (TCP and UDP) communication channels required for traditional clustering software to function are diverse and are easier to manage inside a LAN. For example, below is the list of network ports used for Microsoft Windows Server Failover Clustering (WSFC)

| TCP/UDP | Port | Description |
|---|---|---|
| TCP/UDP | 53 | User & Computer Authentication [DNS] |
| TCP/UDP | 88 | User & Computer Authentication [Kerberos] |
| UDP | 123 | Windows Time [NTP] |
| TCP | 135 | Cluster DCOM Traffic [RPC, EPM] |
| UDP | 137 | User & Computer Authentication [NetLogon, NetBIOS] |
| UDP | 138 | DSF, Group Policy [DFSN, NetLogon, NetBIOS Datagram Service] |
| TCP | 139 | DSF, Group Policy [DFSN, NetLogon, NetBIOS Datagram Service] |
| UDP | 161 | SNMP |
| TCP/UDP | 162 | SNMP Traps |
| TCP/UDP | 389 | User & Computer Authentication [LDAP] |
| TCP/UDP | 445 | User & Computer Authentication [SMB, SMB2, CIFS] |
| TCP/UDP | 464 | User & Computer Authentication [Kerberos Change/Set Password] |
| TCP | 636 | User & Computer Authentication [LDAP SSL] |
| TCP | 3268 | Microsoft Global Catalog |
| TCP | 3269 | Microsoft Global Catalog [SSL] |
| TCP/UDP | 3343 | Cluster Network Communication |
| TCP | 5985 | WinRM 2.0 [Remote PowerShell] |
| TCP | 5986 | WinRM 2.0 HTTPS [Remote PowerShell SECURE] |
| TCP/UDP | 49152-65535 | Dynamic TCP/UDP [Defined Company/Policy {CAN BE CHANGED}] |

These diverse criteria necessitate dedicated interconnecting channels to enable server cluster operations. To span clusters across multiple LANs via the public Internet vendors predominately use of dedicated Virtual Private Networks or VPNs as depicted in FIGS. 2 and 3, for both security, and to provide an unrestricted layer-3 network path between servers to support the diverse set of required layer-4 communication channels.

A VPN is a secure tunnel through which communication and data can flow between two points securely. Recall that the Internet is a packet-switched network meaning there is no single, unbroken connection between sender and receiver. Instead, when information is sent, it is broken into small packets and sent over many different routes to the same location at the same time, and then reassembled at the receiving end. This is opposed to circuit-switch network such as the telephone system which, after a call is made and the circuits are switched, carve out part of the network for a single connection.

Every packet transmitted on the Internet carries information to direct the packet to its location and how it is to be used. For example, some packets may be used to form a website using Hypertext Transfer Protocol, (HTTP) while others may use Internet Message Access Protocol (IMAP) for accessing email. And certainly, each packet needs to know to what address it is being sent and who is the sender. The Transmission Control Protocol (TCP) and the Internet Protocol (IP) is the most common set of protocols for breaking down and reassembling packets.

The TCP/IP model is broken into four layers that address the problem of breaking up data into packets, sending them across the Internet and reassembling them at their destination. These layers include the application, transport, internet, and network access layers. The network access layer is responsible for converting binary data to network signals. This includes the network card on a computer or modem that converts computer friendly data to network friendly signals. The internet layer provides logical addressing, path determination and forwarding.

The application layer comprises various protocols that govern the interaction with an application, data translation, encoding, dialogue control can communication coordination between systems. There are numerous application protocols with some of the more common being HTTP, IMAP, File Transfer Protocol (FTP), Simple Mail Transfer Protocol (SMTP), Domain Name Service (DNS) and the like.

The transport layer is concerned with end-to-end transportation of data and sets up a logical connection between hosts. Two protocols available in this layer are TCP and User Datagram Protocol (UDP). While TCP is a connection orientated and reliable using windowing to control the ordered flow and delivery of data segments, UDP simply transfers data without the bells and whistles providing faster delivery of data.

In a VPN each packet 210 of an origin server 205 is encrypted by a VPN server 215 and then encapsulated 220 inside a normal IP packet for transportation. The normal IP packets have a destination address at the other end of the tunnel. So as the packets move through the internet the true address of the packets cannot be read, only the tunnel address is accessible.

At the receiving end the computer or VPN client 230 strips off the exterior IP packet 220 and decrypts the interior packet 210. Based on that information the interior packet is delivered to the destination 250. This process requires multiple L4 communication channels 310 to affect the secure delivery of data and these layers come at a cost. At its core, a VPN protocol is basically a mix of transmission protocols and encryption standards.

While versatile in limited applications, a need exists to reduce the number of layer-4 communication channels to one per pair of servers. Such an improvement would enable direct server-to-server communication over the public Internet, without the use of a VPN or dedicated private network, and support traversal of NAT routers without any special configuration. Such direct server-to-server communication is critical to foster distributed (public Internet) server cluster architectures. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

A server cluster is a set of servers that work together to provide reliable highly available computing resources. Supporting one or a multiplicity of applications, the cluster can provide a user with confidence that an application is always available. While traditional clusters are formed within a local area network a need continues to grow for clusters spread across vast distances but nonetheless communicatively coupled. The present invention offers an alternative to the common and costly VPN type of connection.

Server cluster communication across the public internet using a single secure User Datagram Protocol (UDP) is facilitated by an intermediary registry server. The intermediary registry server of the present invention, and its associated methodology, enables servers within a cluster and isolated behind a firewall identify peer servers in the cluster group even when located at disparate locations. Using an external address registry shared to each member of a server cluster peer group, individual servers can establish a direct secure channel using a single UDP DTLS tunnel.

One machine implemented methodology of the present invention includes sending, by a server, a reporting message to an intermediary registry server using a User Datagram Protocol (UDP) channel wherein the reporting message is associated with a UDP external endpoint and a UDP internal endpoint. Communication by the intermediary register server, through the UDP channel to the server, gains confirmation of the UDP external endpoint of the server and information with respect to the server's internal endpoint. With such information in hand the intermediary registry server records and shares within the peer group, server identification, the UDP external endpoint, and the UDP internal endpoint of each server using an external address registry.

The methodology of the present invention establishes a secure connection or tunnel between the server and the intermediary registry server through the UDP external port and wherein the UDP channel is a single UDP channel. This secure connection is a Datagram Transport Layer Security (DTLS) session which enables secure sharing of data via the user datagram protocol. It is further possible to establish multiple channels or secure connections between the server and the intermediary registry. In so doing the intermediary registry server associates each additional secure connection as a logical connection with the server using a cookie value, a pre-shared key identifying a peer group, and registration data encrypted using the pre-shared key.

Another feature of the present invention's methodology includes sending by the intermediary registry server, an external address registry status message to the server confirming listing of the UDP channel of the server in the external address registry and a list of other servers registered by the intermediary registry server in the peer group. The list includes registration data of each server in the peer group enabling direct communication between servers such as server identification, UDP channel, UDP external endpoint, a pre-shared key and the like. The status message further includes membership status of each server in the peer group based on the pre-shared key and any changes to membership status of any server in the peer group.

Another feature of the methodology of the present invention is the ability to add other servers to the cluster through invitation. In this instance the intermediary registry server receives from the server a request to create an invitation group wherein the invitation group is associated with a One-Time Private Key (OTPK). Upon receipt the intermediary registry server forms an invitation group linked to the OTPK. While a single server of a peer group may have initiated the request to form and invitation group, the formed invitation group is associated with each member of the peer group.

Once the invitation group is formed, the intermediary registry server establishes a new secure connection through a new UDP channel with an additional server, previously identified as a server that may be desirable to join the peer group. Prior to forming the invitation group, the OTPK was shared with additional server. The intermediary registry server receives from the additional server registration data using the OTPK identifying it as being associated with the invitation group. Thereafter, the intermediary registry server sends to a randomly chosen member of the peer group the registration data from the additional server, and to the additional server, registration data of the randomly chosen member of the peer group to establish a secure channel using the OTPK and confirm the additional server's viability as a member of the peer group. If the additional server is confirmed as being worthy of membership into the peer group, the peer group's pre-shared key is shared with the additional server establishing the additional server as a member of the peer group.

The present invention can be stored on a non-transitory machine-readable storage medium as instructions in machine executable code format that, when executed by at least one machine, causes the machine to perform the methodology described above.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
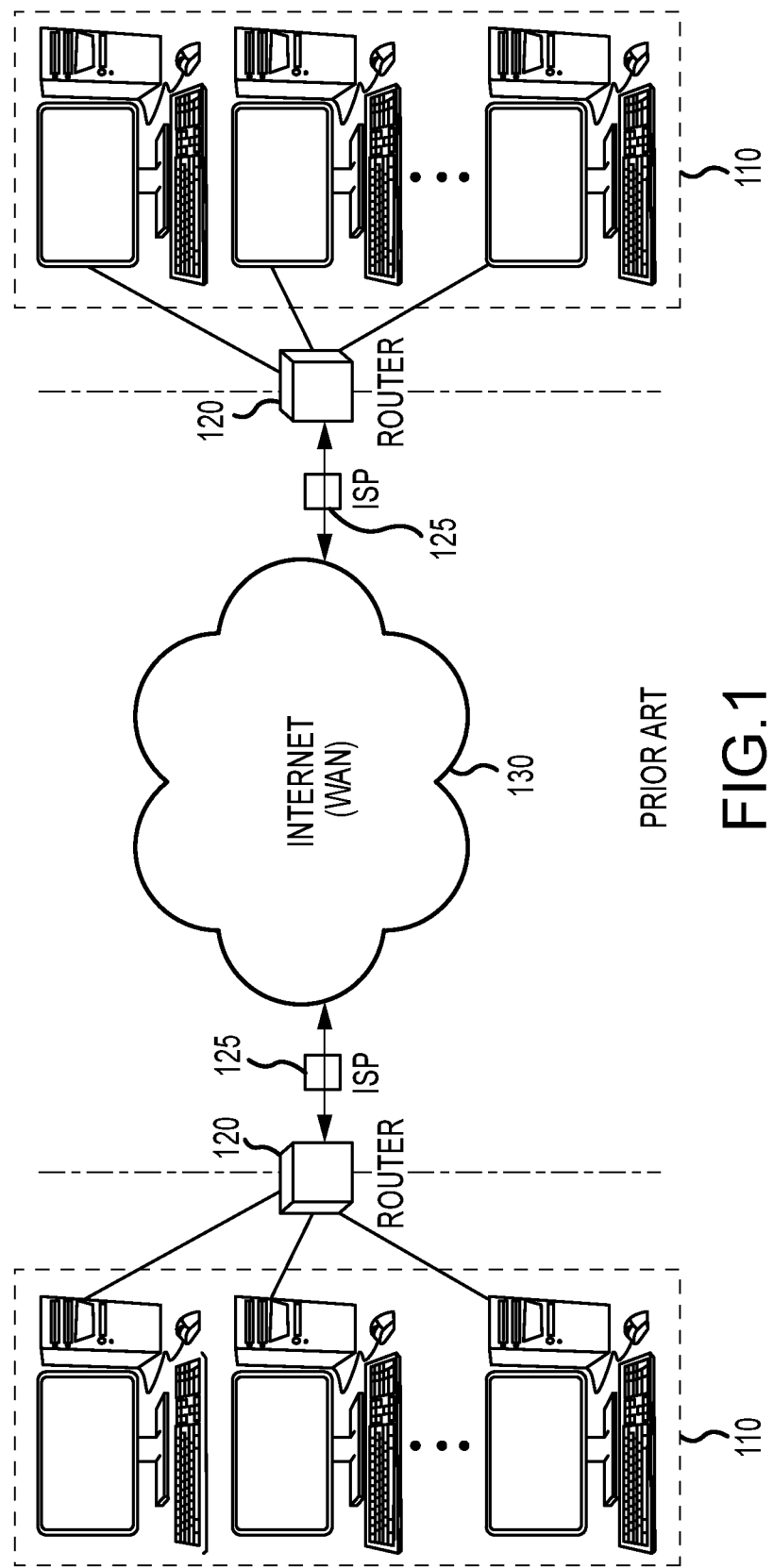
FIG. 1 shows a high-level depiction of a network environment in which one or more local area networks interact with the public Internet.
Figure 2:
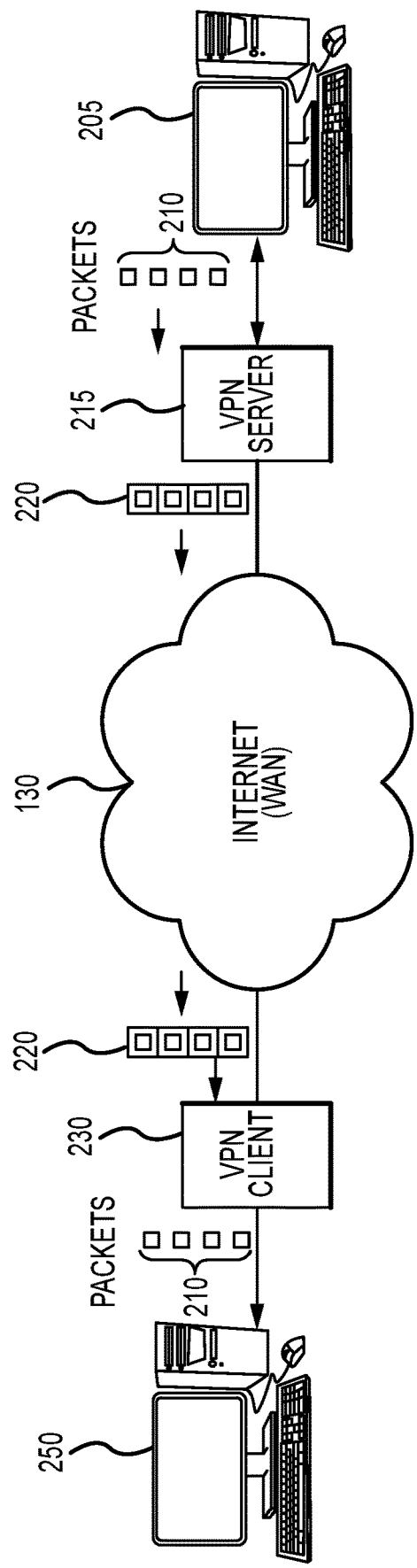
FIG. 2 is a high-level diagram of a virtual private network configuration.
Figure 3:
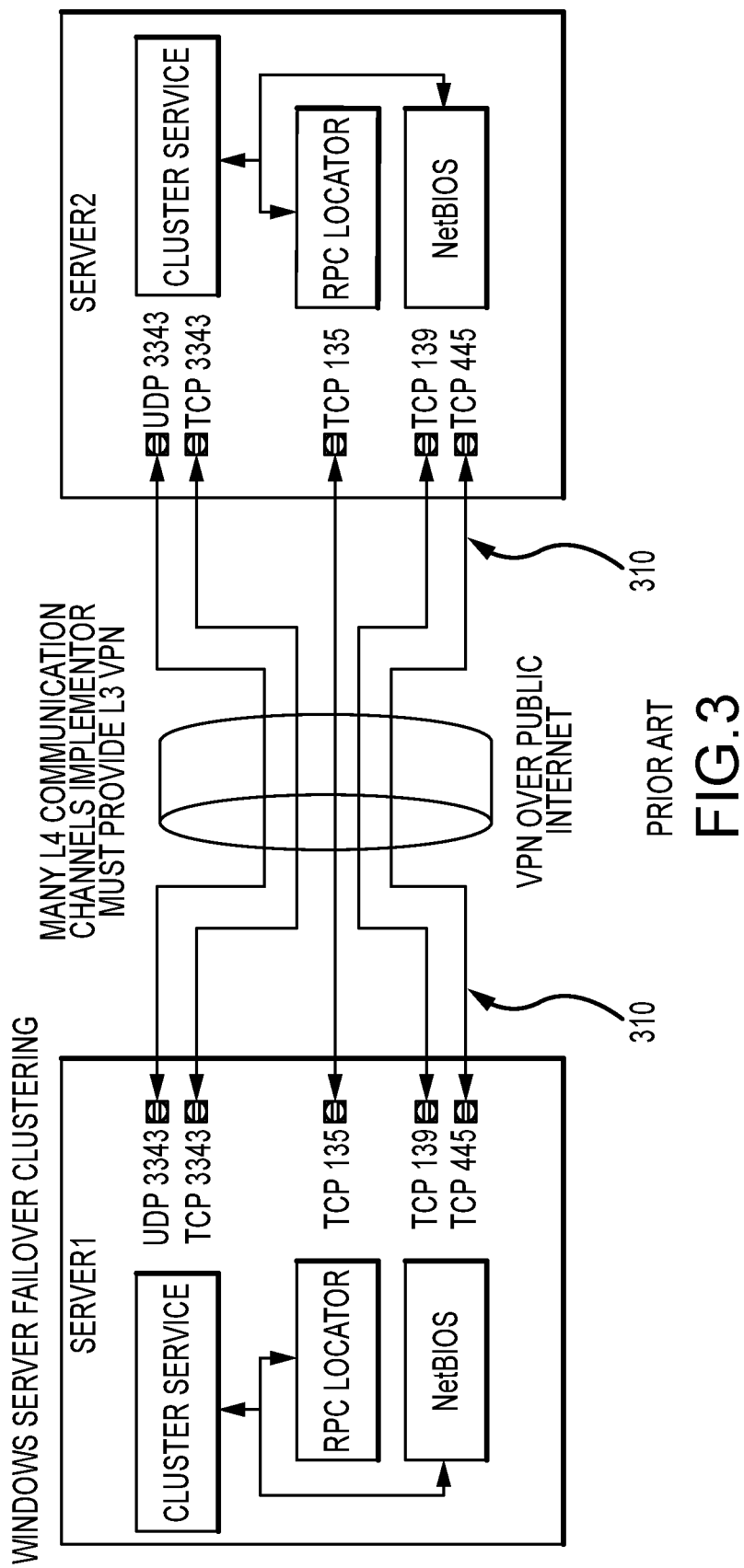
FIG. 3 is a representative server failover configuration for server failover communication through the public Internet using virtual private network communication channel.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Server cluster communication across the public interne using a single secure User Datagram Protocol (UDP) is facilitated by an intermediary registry server. The intermediary registry server of the present invention, and its associated methodology, enable servers within a cluster and isolated behind a firewall identify peer servers in the cluster yet located at disparate locations. Using an external address registry shared to each member of a server cluster peer group, individual servers can establish a direct secure channel using a single UDP tunnel.

A cluster of servers may be used to ensure high availability for mission critical applications and to communicate private information between servers for disaster recovery (failure of one or more servers in the primary cluster). One or more embodiments of the present invention creates an operational configuration of a server cluster over untrusted networks, such as the public Internet, without the use of a Virtual Private Network (VPN), or a secondary network security technology such as IPSec. The present invention further enables clustering of servers over the Internet, communicatively connected by routers performing Network Address Translation (NAT), without any special configuration.

The flexible, server-to-server style of communication for use in a server clustering environment of the present invention facilitates the operation of server clusters with servers in geographically distant locations, on logically distant networks, using only standard Internet connections with NAT routers and without the use of VPNs or any other specially configured networks. Unlike current systems using multiple ports to establish a secure communication tunnel between a single server pair, the present invention establishes a geographical distant server connection using a single UDP port. All of the data between servers is transferred over a single channel by consolidating two different classes of messages. One class of messages is for communication while the other is a "pipe router" which operates much like TCP. A new TCP stack is built and encapsulated under UDP. Whereas a VPN connection opens every port between computers in a secured dedicated communication tunnel, the present invention open and communications on a single dedicated UDP external port.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

For the purpose of the present invention the following acronyms and terms are assumed to represent:

IP—Internet Protocol. Occupies layer-3 in the TCP and OSI Model. The Internet Protocol is responsible for ensuring packets are sent to the correct destination.

IPv4—Internet protocol version 4, with a 32-bit address space.

OSI Model—Open Systems Interconnection model, a standard characterization of functional layers of networking using seven layers as opposed to the four layers of the TCP model.

NAT—Network Address Translation, a technology used prolifically to connect local area networks to the public Internet. NAT enables a plurality of servers (computers) to interact with the public internet via a single external IPv4 address.

TCP—Transmission Control Protocol, a stream-oriented, reliable-delivery data transfer protocol. The Transmission Control Protocol provides a communication service at an intermediate level between an application program and the Internet Protocol. It provides host-to-host connectivity at the transport layer of the Internet model. An application does not need to know the particular mechanisms for sending data via a link to another host, such as the required IP fragmentation, to accommodate the maximum transmission unit of the transmission medium. At the transport layer, (layer 4 in the OSI model) TCP handles all handshaking and transmission details and presents an abstraction of the network connection to the application typically through a network socket interface.

Socket—A network Socket is an endpoint instance, defined by a hostname or IP address and a port, for sending or receiving data within a node on a computer network. A socket is a representation of an endpoint in networking software or protocol stack and is logically analogous to physical female connections between two nodes through a channel wherein the channel is visualized as a cable having two mail connectors plugging into sockets at each node. For two machines on a network to communicate with each other, they must know each other's endpoint instance (hostname/IP address) to exchange data.

Tunnel or Tunneling Protocol (also referred to herein as a channel)—In computer networks, a tunneling protocol is a communications protocol that allows for the movement of data from one network to another. It involves allowing private network communications to be sent across a public network (such as the Internet) through a process called encapsulation. Because tunneling involves repackaging the traffic data into a different form, perhaps with encryption as standard, it can hide the nature of the traffic that is run through a tunnel. The tunneling protocol works by using the data portion of a packet (the payload) to carry the packets that actually provide the service. Tunneling uses a layered protocol model such as those of the OSI or TCP/IP protocol suite, but usually violates the layering when using the payload to carry a service not normally provided by the network. Typically, the delivery protocol operates at an equal or higher level in the layered model than the payload protocol.

Port—A Port is opening on a machine through which data can flow.

UDP—User Datagram Protocol, is a not-necessarily-in-order datagram delivery protocol, used over IP. UDP uses a simple connectionless communication model with a minimum of protocol mechanisms. UDP provides checksums for data integrity, and port numbers for addressing different functions at the source and destination of the datagram. It has no handshaking dialogues, and thus exposes the user's program to any unreliability of the underlying network. Occupies layer-4 in the OSI model.

LAN—Local Area Network

WAN—Wide Area Network, a network that typically connects distant sites to one another or to the public Internet. The public Internet is considered a WAN.

VPN—Virtual Private Network. A layer-2 and/or layer-3 networking technology that allows local networks to be securely extended or bridged over WANs, such as the public Internet.

WSFC—Microsoft Windows Server Failover Clustering; software that allows servers working together as a computer cluster.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Figure 4A:
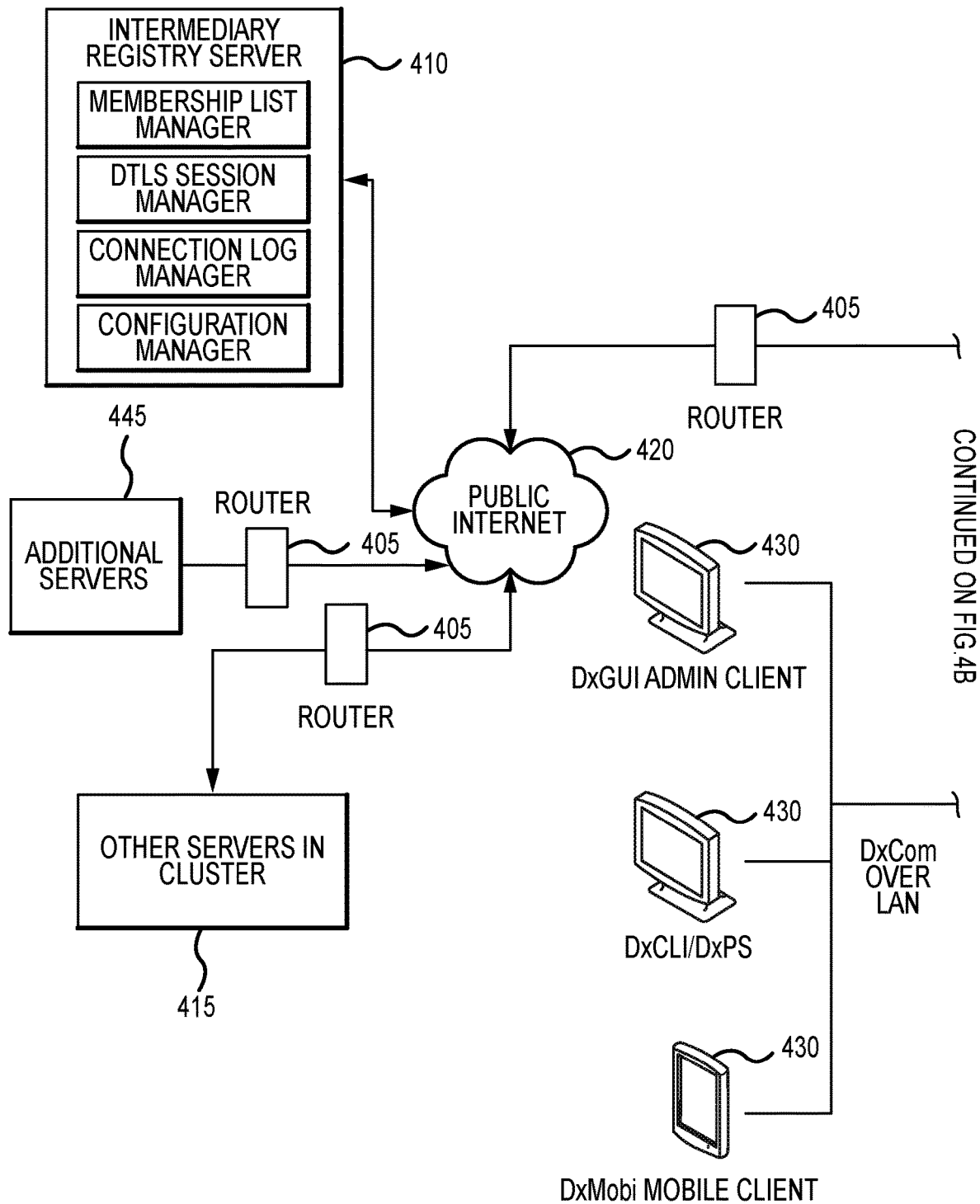
FIGS. 4A-4B represent a high-level system diagram of a server in a server cluster showing internal logical components and its communicative relationship to other servers in the cluster via the public internet using a single UDP secure channel, according to one embodiment of the present invention.
Figure 4B:
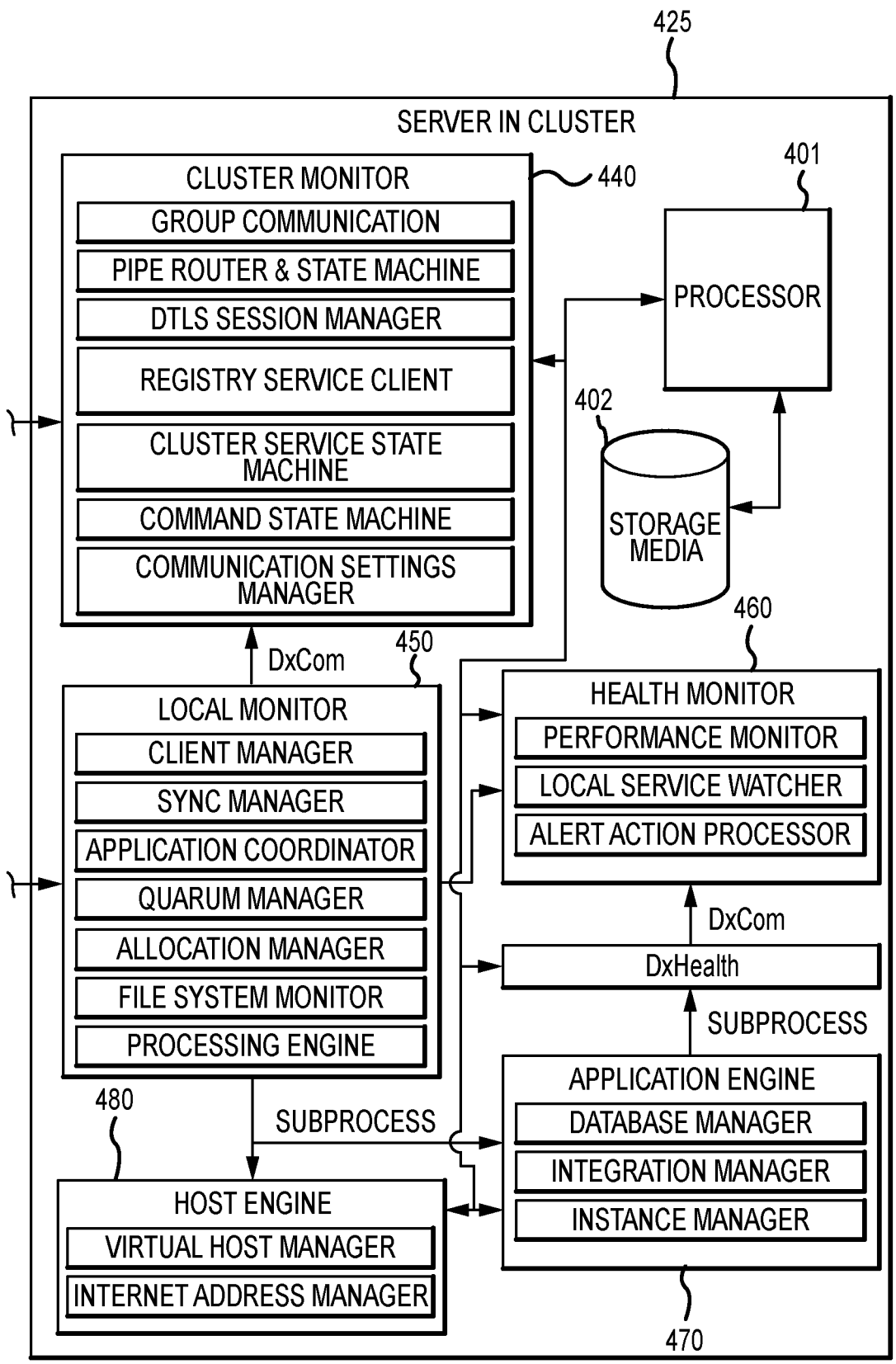

An intermediary registry server, interposed between a multiplicity of servers in a cluster, enables direct server-to-server communication using a single secure UDP tunnel. FIG. 4 depicts a high-level architecture of a system for facilitating server cluster communication over the Internet. For example, a use case may exists wherein a server cluster that includes servers owned and operated by a particular organization, resides in that organization's data center, while other servers are leased from a cloud service provider such as Amazon AWS or Microsoft Azure. To create a distributed server cluster as described, one needs only to install software on each server incorporating the present invention, and join the servers together into a cluster via unitary UDP channels. Other clustering software, such as Microsoft Windows Server Failover Clustering, requires substantially more complex setup, using multiple channels and includes configuring and using a VPN.

A server within a LAN and connected to the public Internet through a NAT router has no direct knowledge that it is connected through a NAT router, nor of how the NAT router is attached to the public Internet, or what public Internet addresses the NAT router might be using. The server knows only the addressing scheme of the internal LAN. The NAT router assigns and manages internal endpoint addresses but provides a security barrier, a firewall, between the internal servers and networks outside of the NAT (in most instances the public Internet). The presence of a NAT router, and the specific details of how it communicates outside of the LAN must be discovered to facilitate server-to-server communication over the Internet.

Open embodiment of the present invention facilitates discovery of NAT routers 405, and of direct server-to-server communication through NAT routers using an intermediary registry server 410. When configured to do so, each server within a cluster 415 maintains periodic, minimal contact with the intermediary registry server service, and by doing so receives a report from the intermediary registry server of its own apparent external address and port mapping, and information as to the external address and port mappings of other servers in its server cluster.

Using the intermediary registry server 410, a server in a particular cluster 415 can test whether it is connected to the Internet 420 through a NAT router 405, and determine what public Internet address, also referred to herein as an external endpoint, the NAT router is using. Using this information, other servers can initiate communication using the apparent external endpoint of the server.

The intermediary registry server 410 does not act as a relay for server-to-server communication. Rather, the intermediary registry server tests for connectivity through a NAT router, reports the presence of one server to others in the same cluster, and shares observed external endpoints between servers in the same cluster. Using this information each server within the cluster can thereafter initiate endpoint discovery of other servers in the same cluster.

Rather creating a VPN tunnel between servers and opening all of the ports to each server, one embodiment of the present invention consolidates all communication between any two servers into a single User Datagram Protocol datagram channel. All communication necessary to operate the server cluster is performed over these UDP datagram channels, and no additional communication channels between servers are required. By comparison, current clustering software comparison use many diverse layer-4 communication channels with little attention toward consolidation or integration. This practice is costly and inefficient.

UDP communication channels are not inherently secure. Accordingly, the present invention specifies the use of the DTLS protocol to provide security for its UDP datagram channels, although any similar method of public-key authentication and session key negotiation is compatible with the present invention and is contemplated as being within the invention scope. DTLS allows the server on each end of the channel to authenticate the other server using public key cryptography, and encrypt the datagram payloads to protect their contents from interlopers on untrusted networks. DTLS is similar to the more commonly-used TLS protocol, but supports operation over UDP.

As shown in FIG. 4 a server 425 in a cluster is communicatively coupled to the public Internet 420 as well as one or more clients 430. Also, communicatively coupled to the public Internet 420 is the intermediary registry server 410, other servers 445, and other servers in the cluster 415. In each case the servers are located behind one or more routers 405 which masks the server's external endpoint from the server.

Each server in the cluster includes a cluster monitor 440 which is responsible for establishing communication of all available servers participating in a cluster, monitoring server availability, providing virtual synchrony through its coordinator, monitoring and synchronizing the state of cluster services, and relaying commands between cluster service members. From the viewpoint of the cluster monitor of a server, a cluster service is an external software component participating in a named group of severs. Thus, other servers 415 within the cluster are viewed as providing a cluster service. The cluster monitor also informs all cluster services (other servers) participating in the same cluster or peer group of each other's presence, and any changes that may occur to that group. Within each server, the local monitor component functions as a cluster service.

Turning attention to FIG. 4, the cluster monitor further includes:

Group Communication—The Group Communication module establishes communication with all available servers involved in the cluster, monitors server availability and communication channels, and elects a server as the cluster coordinator.

Pipe Router and State Machine—The Piper Router and State Machine provides reliable, in-order stream-oriented messaging channels over the established UDP communication channel. The Piper Router and State Machine manages pipe sockets, both listening sockets and outgoing connections. The pipe state machine is similar to the TCP module found in most operating system kernels, and performs largely the same function. The Piper Router and State Machine acts as a private TCP-like software component within the Cluster Monitor component.

DTLS session manager—The DTLS session manager responsible for establishing authenticated DTLS sessions with other servers in the cluster over a single UDP channel.

Registry Service Client—The Registry Service Client manages communication with the intermediary registry server, including NAT configuration discovery, group registrations, and invitations.

Cluster Service State Machine—The Cluster Service State Machine monitors availability of Cluster Services, processes changes to the set of available Cluster Services, and informs active Cluster Service components running on each system of the current service membership.

Command State Machine—The Command State Machine monitors the state of relay commands submitted by various Cluster Services. This module ensures consistent ordering of relayed commands, and the reliability of responses are sent back to the issuers of those commands.

Communication Settings Manager—The Communication Settings

Manager maintains administratively configured details of the cluster, including the list of systems, their network addresses, cryptographic secrets and the like. This Manager manages the process of adding and removing systems in an active cluster.

Each server in the cluster further includes, among other things, a local monitor 450, a health monitor 460, an application engine 470, a host engine 480 as well as a processor (machine) 401 and a non-transitory storage media 402. The local monitor is responsible for receiving and forwarding requests from a user interface to host engine, application engine, and cluster monitor. The local monitor, and other sub-components used by it carry out the high-availability clustering aspect of the invention. Features of the local monitor include:

Client Manager—The Client Manager handles incoming client requests, passing the requests to the application coordinator or processing engine, and maintaining client connections.

Sync Manager—The Sync Manager maintains administrative configuration of virtual hosts and applications. It also synchronizes configuration between systems as cluster membership changes.

Application Coordinator—The Application Coordinator executes cluster-wide administrative commands and maintains cluster invariants related to virtual hosts and managed applications. For example, if a system fails, and that system was hosting a particular application, the Application Coordinator will ensure that the application is restarted on another available system.

Quorum Manager—The Quorum Manager determines whether the active cluster has a quorum based on the configuration. This Manager shuts down active applications if no quorum exists. For example, if two sub-groups of the same cluster are able to communicate among themselves but unable to communicate with one another, they will form two independent clusters. Quorum manager ensures that only one of those clusters attempts to start a application.

Allocation Manager—The Allocation Manager monitors the set of applications active on each system, and guides automatic application placement decisions based on configured resource requirements and availability.

File System Monitor—The File System Monitor monitors the availability of file system paths for applications, and reports state information to the cluster coordinator.

Processing Engine—The Processing Engine parses and carries out client requests by forwarding the requests to Host Engine, Application Engine, and/or Sync Manager.

The host engine 480 is responsible for establishing and maintaining virtual hosts and virtual IP addresses. It includes a Virtual Host Manager responsible for maintaining and managing virtual hosts, and an Internet Address Manager, that manages virtual IP address subscriptions. Each server within a cluster includes, as stated herein and among other things, a local monitor engine, a cluster monitor engine, a host engine, and an application engine. The host engine is operable to form at least one virtual host and associated virtual Internet protocol address. For purposes of the present invention, a virtual host is a logical instance container that operates on top of physical and virtual servers, and accordingly does not include an operating system. A virtual host is not a virtual machine. Each virtual host instantiates and is tied to at least one virtual IP address. Server cluster application virtualization includes at least one instantiation of an application that is configured to operate on top of one of the one or more virtual hosts at each server. Accordingly, upon failover the virtual host migrates to another server along with the application instance(s) and the virtual IP address(es), using, in this instance, a secure UDP DLTS tunnel.

The application engine 470 is responsible for establishing and managing an application [SQL Server] (i.e. virtualized application). Features of the application engine include:

Database Manager—The Database Manager maintains and manages instance database files per [SQL Server] application instance.

Instance Manager—The Instance Manager maintains and manages instance configuration stored on disk.

Integration Manager—The Integration Manager handles instance registration with Registry and Health Monitor.

The health monitor 460 is responsible for monitoring application health and signaling a failover or failback event. Features of the health monitor include:

Performance Monitor—the Performance Monitor monitors CPU, memory, and I/O utilization of the system and the relevant application processes.

Service Watcher—The Service Watcher monitors service health and raising events based on registration policy.

Alert Action Processor—The Alert Action Processor sends emails and invoking scripts in response to alerts and application conditions.

The intermediary registry server 410 (or module) couples geographically separated servers to form a server cluster using a single secure UDP channel rather than a more traditional VPN connection. The intermediary register server includes several modules whose features include:

Membership List Manager—The Membership List Manager maintains a list of known servers that are in contact and associated with a pre-shared key, the peer groups they claim to belong to, and informs other servers within the same peer group of changes to the group. The Membership List Manager also handles invitation requests for cluster formation and the addition of new servers in a specified peer group.

DTLS session manager—The DTLS session manager is responsible for establishing DTLS sessions with servers acting as clients. This manager is NOT used for authentication, but for nominal message privacy.

Connection log manager—The Connection log manager maintains, when enabled, a log of which servers have been in contact with the intermediary registry server, when contact is established, and when contact is lost. This manager can be used for potential metering and billing purposes.

Configuration manager—The Configuration manager maintains configuration of the intermediary registry server, including the addresses it should be listening on, and a server blacklist.

The present invention enables the creation of simplified geo-clusters wherein one or more servers reside in a first facility, perhaps belonging to an operator, can join with additional servers residing in a geographically distant facility to form a server cluster distributed over the Internet using a singular UDP DLTS channels. The servers, though not collocated or part of a LAN, can form a cluster using a standard Internet connection and a NAT router.

Figure 5:
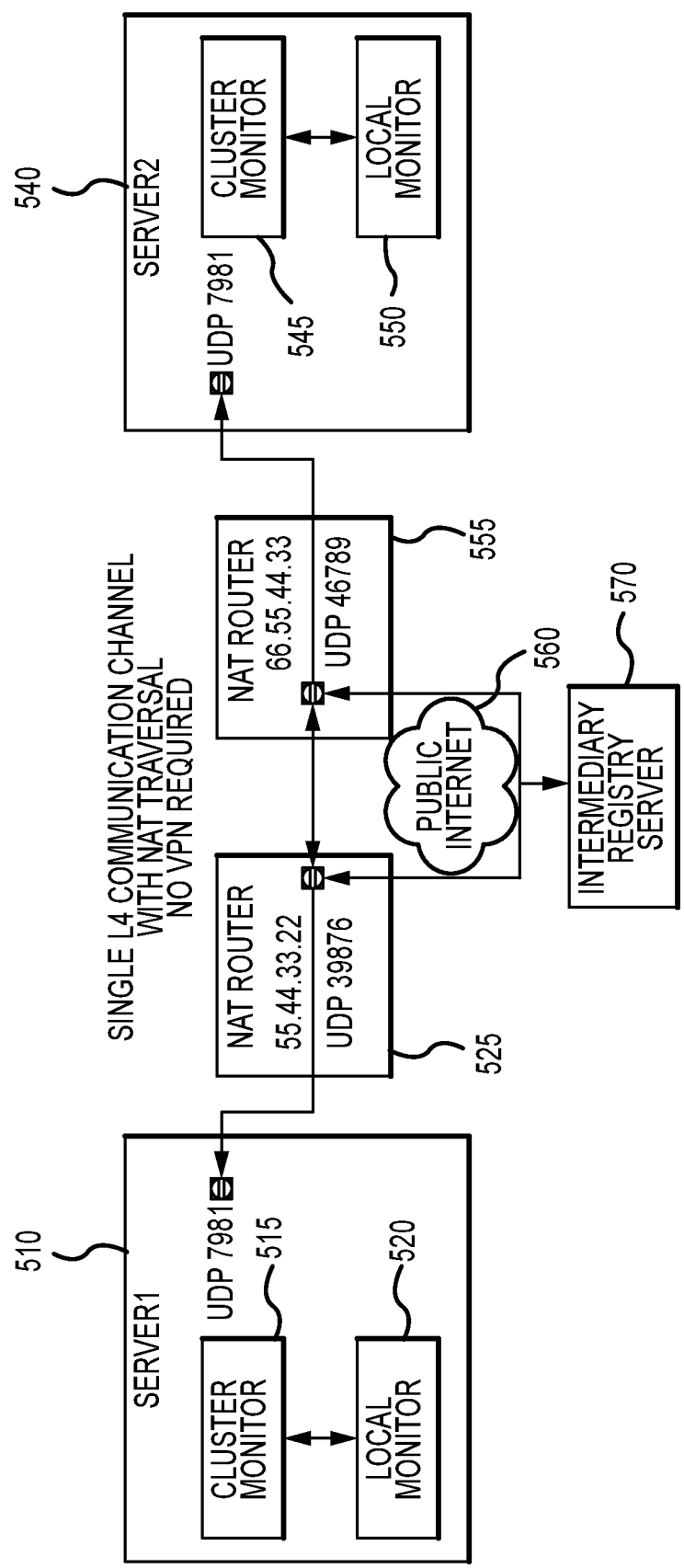
FIG. 5 is a simplified system architecture drawing of two servers of a server cluster in communication with an intermediary registry server, according to one embodiment of the present invention.

As shown in FIG. 5, a first server 510 having, among other things, a cluster monitor 515 and local monitor 520, interacts within a LAN to a NAT router 525. In this instance the first server opens a UDP port 7981 to the router 525. The router 525 manages this server as well as others in the LAN but represents it externally with address of 55.44.33.22 via a UDP port 39876.

Similarly, a second server 540, server 2, interacts with its router 555 via UDP port 7981. The second NAT router 555 has an external endpoint address of 66.55.44.33 via UDP port 46789.

Interposed between the first router 525 and a second router 555 is the public Internet 560 and the intermediary registry server 570 of the present invention. In this example, the intermediary registry server is aware of the first server 570 and the second server 540 thought their respective routers. One of reasonable skill in the relevant art will appreciate that a multiplicity of severs may exist behind each NAT router and a multiplicity of other NAT routers and servers are also coupled to the Internet. Moreover, there may be several NAT router between the intermediary registry server each server within the final LAN. As will be described hereafter, the intermediary registry server, conveys external and internal endpoint information to both servers based each server being associated with the same pre-shared key.

In another embodiment of the present invention, a cloud-to-premises server cluster can be created. One or more servers belonging to an operator can be combined with one or more servers leased from a cloud hosting provider to create a server cluster using the techniques described herein. The invention enables an entity to scale and address a need for additional capability without committing resources for additional hardware.

Figure 6:
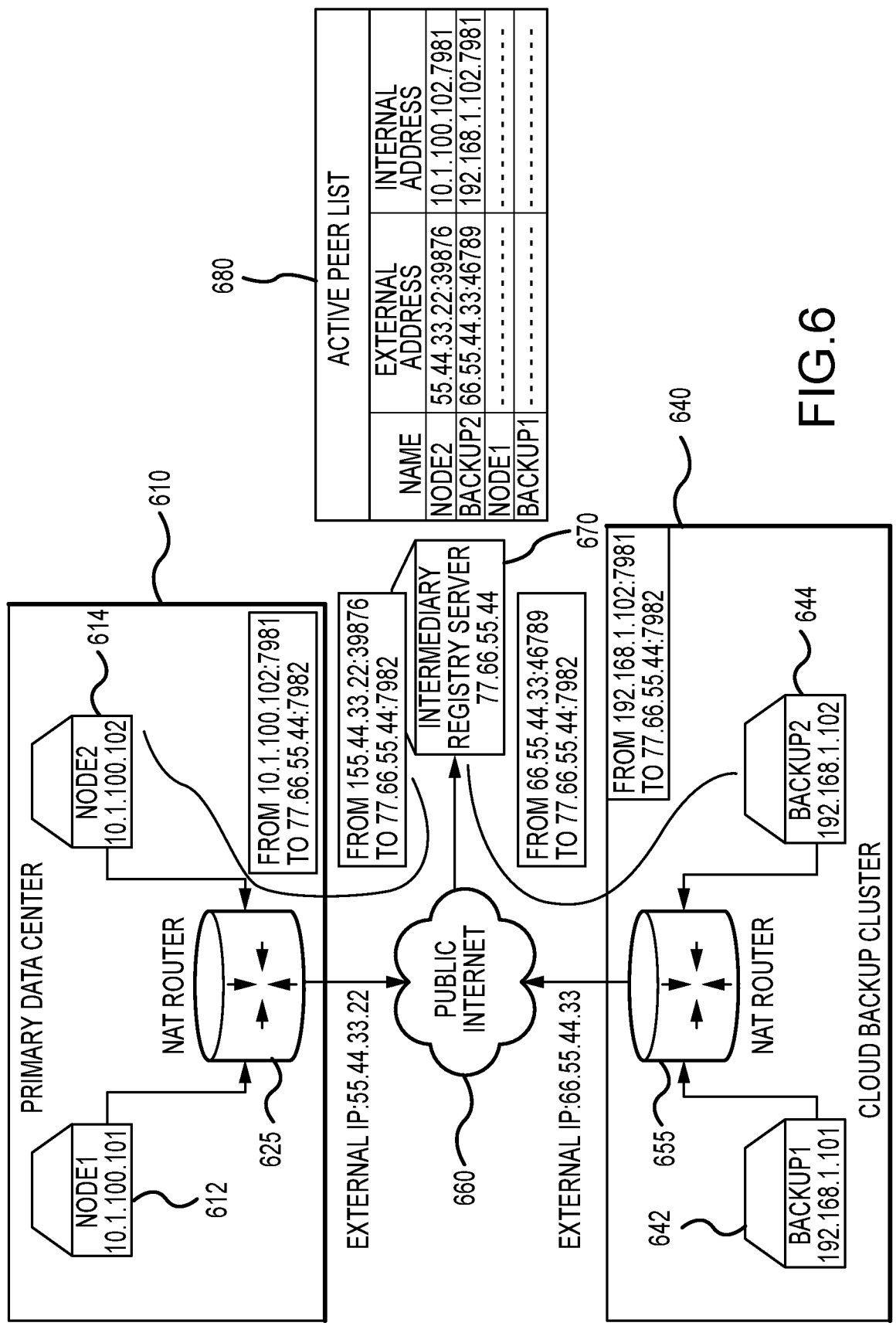
FIG. 6 depicts communication channels between two servers in a server cluster and an intermediary registry server as well as external and internal endpoint information, according to one embodiment of the present invention.

The role of the intermediary registry server shown in FIG. 5 can be better understood with additional reference to FIG. 6. The intermediary registry server 670 of the present invention is communicatively coupled to the public Internet 660. In the example shown in FIG. 6, a primary data center 610 and a cloud back cluster 640 is also communicatively coupled to the Internet. As will be recognized by one of ordinary skill in the relevant art, the illustration of a data center and a cloud backup cluster is demonstrative of the flexibility and scalability of the present invention.

In this example, the primary data center 610 includes two representative nodes 612, 614, or servers as they otherwise may be considered which may or may not represent two nodes in a cluster housed by the primary data center. The backup cluster includes two representative backup servers 642, 644. One application of the present invention is the ability for cluster technology, including backup and failover resources, to be distributed over the public Internet 660 without necessitating costly VPN connections. In both cases of the configuration shown in FIG. 6, the primary nodes 612, 614 and backup servers 642, 644 are coupled to the Internet 660 through a NAT router 625, 655. Each router forms a firewall around the LAN creating an avenue by which those servers or nodes within the LAN communicate with the Internet and a gateway by which any external connections to the same servers or nodes must pass.

From the perspective of the public Internet and any entity attempting to reach a sever or node within each respective LAN, those entities would address the routers external endpoint address. Using information contained within the message, the router would thereafter identify which server or node within the LAN to direct the message. In this instance, the external endpoint address of the primary data center 610 is 55.44.33.22. Internally in the primary data center the internal endpoint address of Node 1 612 is 10.1.100.101 and the internal endpoint address of Node 2 614 is 10.1.100.102. As communications arrive at the primary data center the NAT router directs them to the proper location using these addresses.

Similarly, the external endpoint address of the cloud backup cluster 640 is 66.55.44.33. The internal endpoint address for Backup1 642 is 192.168.1.101 and the internal endpoint address for Backup2 644 is 192.168.1.102.

The intermediary registry server 670 of the present invention is also communicatively coupled to the public Internet 660 and identified under its external endpoint address of 77.66.55.44. The intermediary registry server 670 acts as a connection broker to enable servers or nodes located within LANs to securely communicate with each other without having the cost and inefficiencies of a dedicated VPN connection. The present invention accomplishes this, in part, by memorializing external and internal endpoint information for each server or node in an active peer list 680 or registry.

To better understand the role of the intermediary registry server consider the following example. Assume Node2 614 desires to establish Backup2 644 as a failover server to provide highly available application services. To do so Backup2 644 and Node2 614 must be in direct communication but they are located in different locations and can only communicate via the Internet 660. To establish a secure connection, Node2 must know Backup2's external and internal endpoint address. Similarly, Backup2 must know Node2's external and internal endpoint address to accept and verify the communication.

Under normal circumstances, Node2 614, would direct a message to its NAT router 625 using Backup2's external endpoint address. The message would be from 10.1.100.102.7981 to the primary data center's NAT router 625 wherein 7981 is the port between the router and the node. Included in the message would be data identifying Backup2 644 and cloud backup cluster's external endpoint address of 66.55.44.33. Using that information the primary data center router 625 would send a message from 55.44.33.22.39876 to the cloud backup cluster router 655 66.55.44.33.46789. Once the cloud backup cluster router 655 receives the message it would forward the message to Backup2 644 at 192.168.1.102.7982. Unfortunately the ports are dynamic as are the addresses.

The intermediary registry server 670 provides internal and external endpoint information to both parties so they can communicate directly. Referring again to FIG. 6 and according to the present invention, a message from Node2 614 directed to the intermediary registry server 670 is again from 55.44.33.22.39876 but directed to 77.66.55.44.7982. Similarly, a message from Backup2 644 to the intermediary registry server 670 is from 66.55.44.33.46789 to 77.66.55.44.46789.

Upon receiving the messages from Node2 614 and Backup2 644, the intermediary registry server 670 responds and gains from each party information with respect to its internal endpoint. It also associates this information with a pre-shared key. As Node2 614 and Backup2 644 are part of the same server cluster system, they both possess the same pre-shared key and are thereby associated by the intermediary registry server 670 as being members of the same peer group. The pre-shared key is a cryptographic key that is shared apart from the present invention via email, file transfer or similar mechanism. The key signifies association with the cluster and the formation of the peer group. As a member of a peer group, each receives access to endpoint information of the other stored in an external endpoint registry 680 at the intermediary registry server 670. With such information in hand, both can initiate, as described hereafter, direct secure communication with the other.

Figure 7:
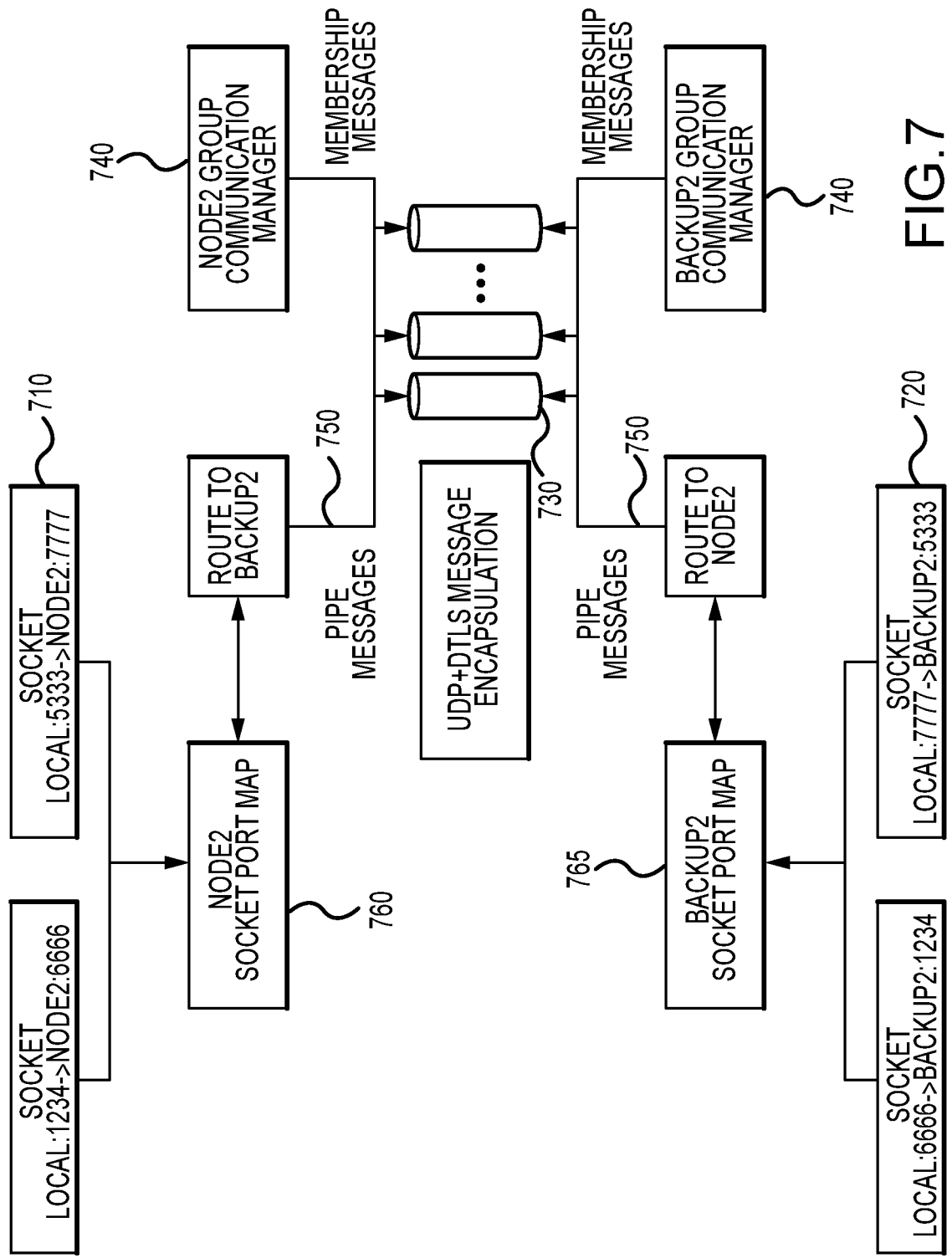
FIG. 7 is a logical representation of communication between two servers in a server cluster through UDP and DTLS encapsulated tunnels established using one embodiment of an intermediary registry server of the present invention.

FIG. 7 presents a logical depiction of a UDP channel enabled by the intermediary registry server of the present invention. As with FIG. 6, FIG. 7 shows a logical connection between Node2 614 and Backup2 644 through a UDP DTLS channel 730. Messages sent over a UDP DTLS channel comes in at least two forms, serving different purposes. These include:

Group Communication Protocol messages ("Membership messages.") These messages managed by a group communication manager 740, are used to determine the responsiveness of other members of the server cluster, to reach a group consensus over which servers are currently available, and which server is the cluster coordinator. These messages do not need to be reliably delivered, or delivered in any specific order, but must be delivered as soon as possible, in order to quickly react to loss of communication.

Pipe messages. Pipe messages 750 provide reliable-delivery, stream-oriented channels, similar to Terminal Control Protocol (TCP) messages. Pipe messages operate in socket session contexts, and are multiplexed and routed using port numbers similar to TCP. Data on pipe sockets are delivered reliably and in order, and bear traffic for all higher-level cluster management functions. Pipe messages require a complex state machine to generate and process.

Using a pre-shared key Node2 614 and Backup2 644 establish a secure channel 730 by which pipe messages 750 can be exchanged. For example socket instance 5333 of Node2 710 is tunneled through Node1's socket port map 760 to the Backup2's socket port map 765 to Backup2's 720 socket instance 7777. As each node may have multiple instances and each LAN may have a multiplicity of nodes, a communication manager 740 for both Node2 and Backup2 manages the pipes and their membership with the peer group.

To further aid in the understanding of the present invention are flowcharts depicting examples of the methodology which may be used to create UDP DTLS messaging between servers in a server cluster via the Internet using according to the present invention. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Figure 8:
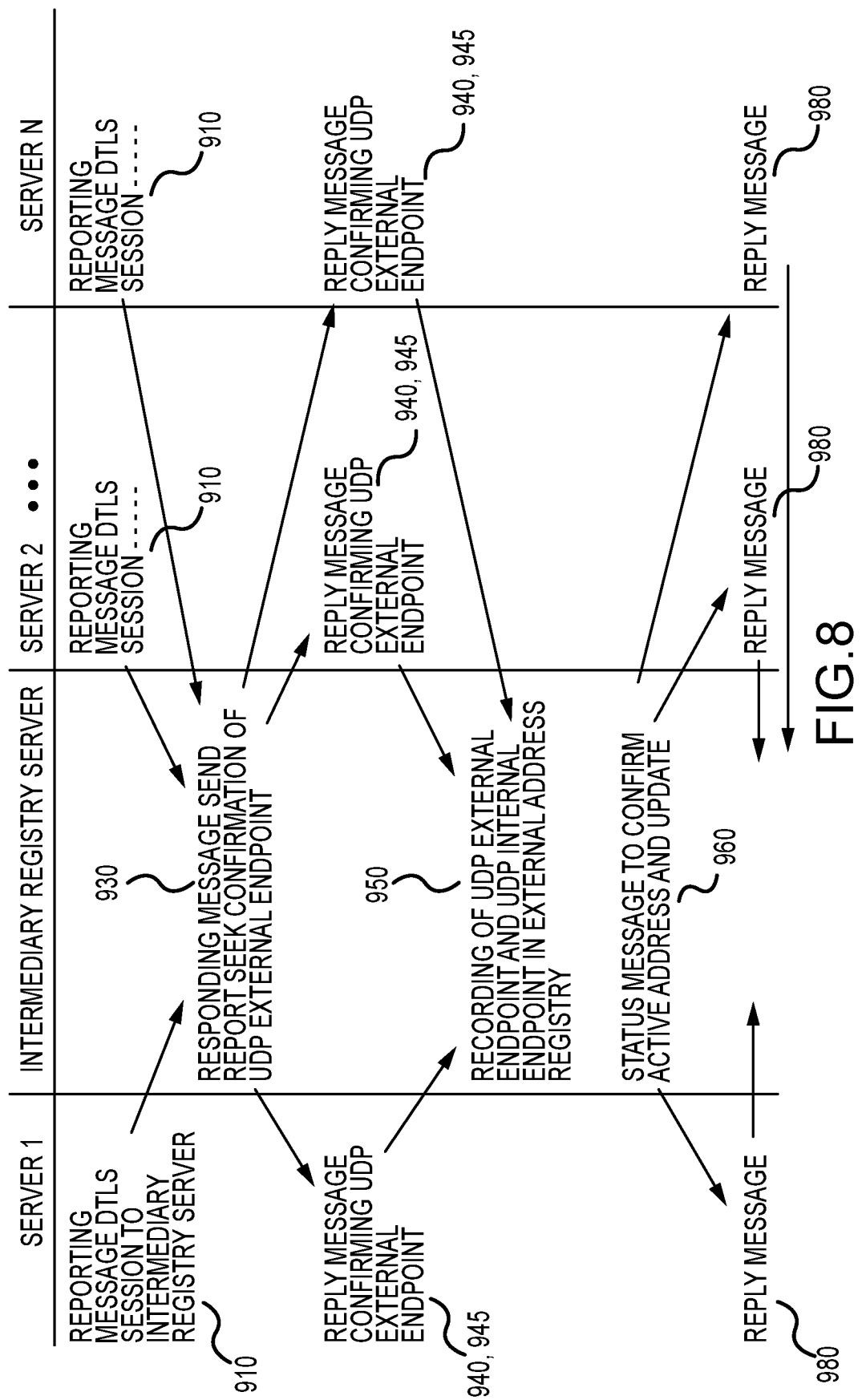
FIG. 8 is, according to one embodiment of the present invention, a communication schematic for establishing a server cluster peer group registry in an intermediary registry server.
Figure 9:
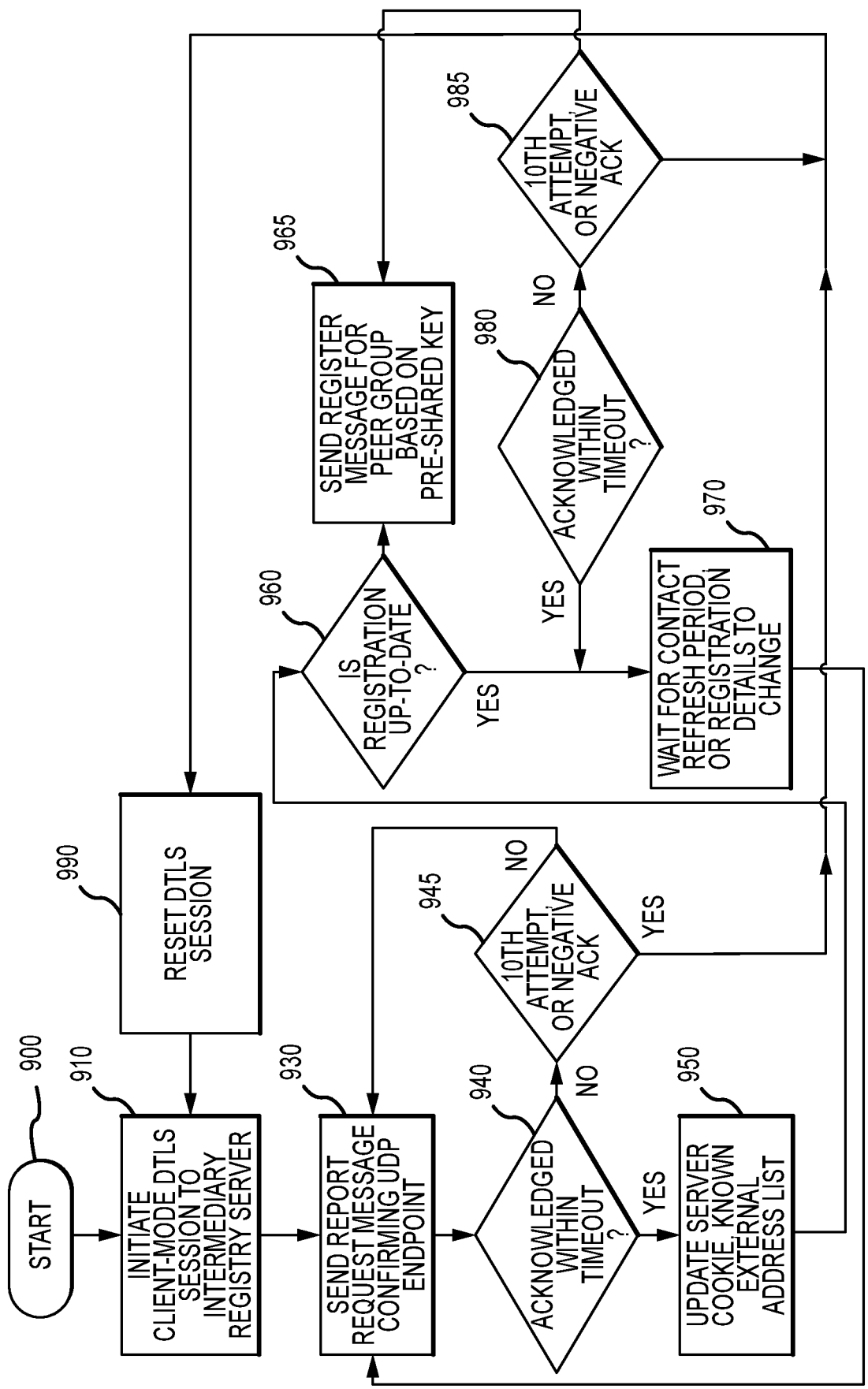
FIG. 9 is a flowchart of one method embodiment of the present invention for establishing and maintaining group registry in an intermediary registry server.

The intermediary registry server, and the intermediary client component of the cluster monitor resident on each server, communicate using a simplified message-oriented system described below and as shown in FIGS. 8 and 9. Each server in the cluster contains a state machine used to maintain contact with the intermediary registry server. (See also FIG. 4B) The communication system has behavior described below:

1. Each cluster monitor instance uses one UDP socket to communicate with other servers of the same cluster, as well as the intermediary registry server 910. Typically, this UDP socket is bound to a well-known UDP port. The Cluster Monitor instance may optionally use a secondary UDP socket, bound to a pseudorandom port, to communicate with the intermediary registry server, and other servers through discovered endpoints. Use of the same socket to communicate with other servers as well as the intermediary registry server assists in endpoint discover as most types of NAT routers will use the same external address mapping for the same internal address and port. This allows the apparent external endpoint to be properly reported by the intermediary registry server.
2. Communication with the intermediary registry server is over a UDP port for which delivery is generally accepted as being is non-reliable and non-ordered.
   Because of this, the cluster server may be required to retransmit requests 930, 940, 945 until either receiving a response, or timing out due to loss of contact with the intermediary registry server. The cluster server, as designed, will retry up to 10 times 945 before resetting the session 990.
   Further, each cluster server must maintain periodic contact with the intermediary registry server, otherwise the intermediary registry server will consider the server lost, and remove its registration data from the registry.
3. The cluster server will next establish a DTLS session with the intermediary registry server. The cluster server may establish multiple DTLS sessions with the intermediary registry server, to support redundant network paths, and will use a cookie value (described below in step 4) to inform the intermediary registry server that two sessions belong to the same logical cluster server.
4. The cluster server will confirm 960 its current known apparent external endpoint address with the intermediary registry server by sending a report message. The report message contains no additional data. The intermediary registry server will respond with a "status" message containing:
   A cookie value (pre-shared key) associated with the cluster server, which was either randomly generated when the DTLS association was created, or generated from another DTLS association and specified when the client subsequently registered itself into a cluster group. The cookie value allows multiple DTLS associations belonging to the client to be linked;
   The apparent external endpoint address each cluster server is using to communicate with the intermediary registry server; and
   A sequence number, for each cluster group for which the cluster server has issued registration.
5. To create or update its entry 950 in the intermediary registry server's host list, as needed, the cluster server will send a registration message 965. The intermediary registry server maintains lists of servers by their reported group identities. The group identity is based on a cryptographic secret key that is pre-shared between all servers belonging to the same cluster. The registration message contains:
   A cookie value, returned by the server as part of a status message (described above in step 4);
   The 128-bit identity value for the server's primary cluster group;
   An encrypted data blob, containing the server's name and internal endpoint address, encrypted using the primary cluster group pre-shared key;
   Optionally, the 128-bit identity value for a cluster server's invitation group; and
   Optionally, an encrypted data blob, containing the cluster server's name and known internal endpoint addresses, encrypted using a One Time Pass Key (also referred to herein as an invitation key).
6. The registration message will be replied to 980 with either:
   A status message (described above in step 4) 960 from the intermediary registry server, indicating that the peer group membership has not changed since the last time registration was requested, or
   A peer list message, including the revision number of the cluster peer group, and the registration details of all other known peers in the cluster group, including their encrypted blobs.
7. The peer list message provides total information to all servers of a particular peer group in contact with the intermediary registry server. Each server has the apparent external endpoint addresses of all other servers in the peer group and can attempt to initiate direct communication with each of them. In one embodiment of the present invention communication is attempted from all possible directions, to support traversal of symmetric NATs.
8. When the composition of a cluster group changes, the intermediary registry server will send and updated status message to all registered group members that were not affected by the changes, describing the new peer list, specific additions, updates, and removals of group members.

Figure 10A:
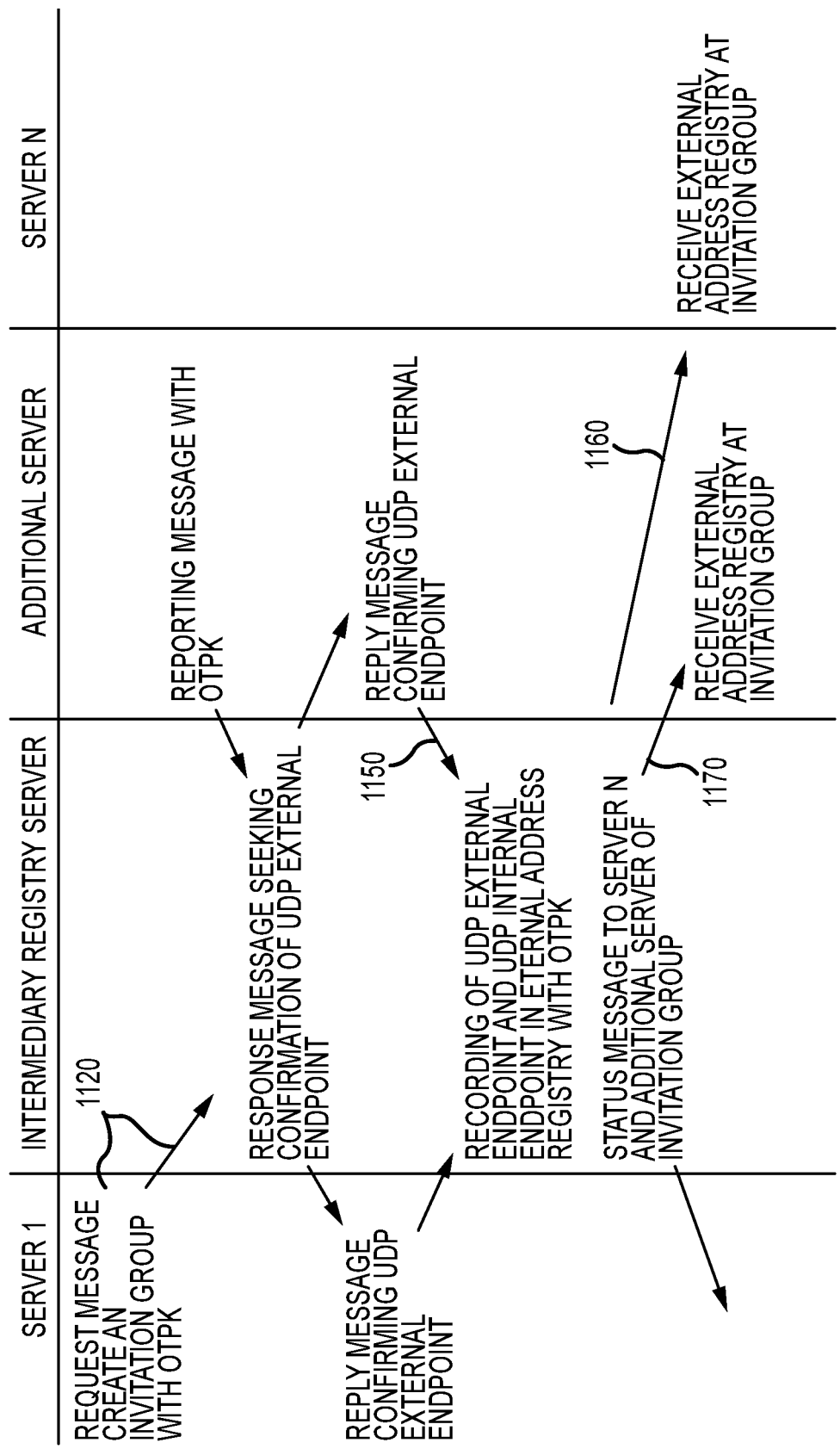
FIGS. 10A-10B represent, according to one embodiment of the present invention, a communication schematic for establishing an invitation group in an intermediary registry server and adding an additional server to an existing server cluster peer group.
Figure 10B:
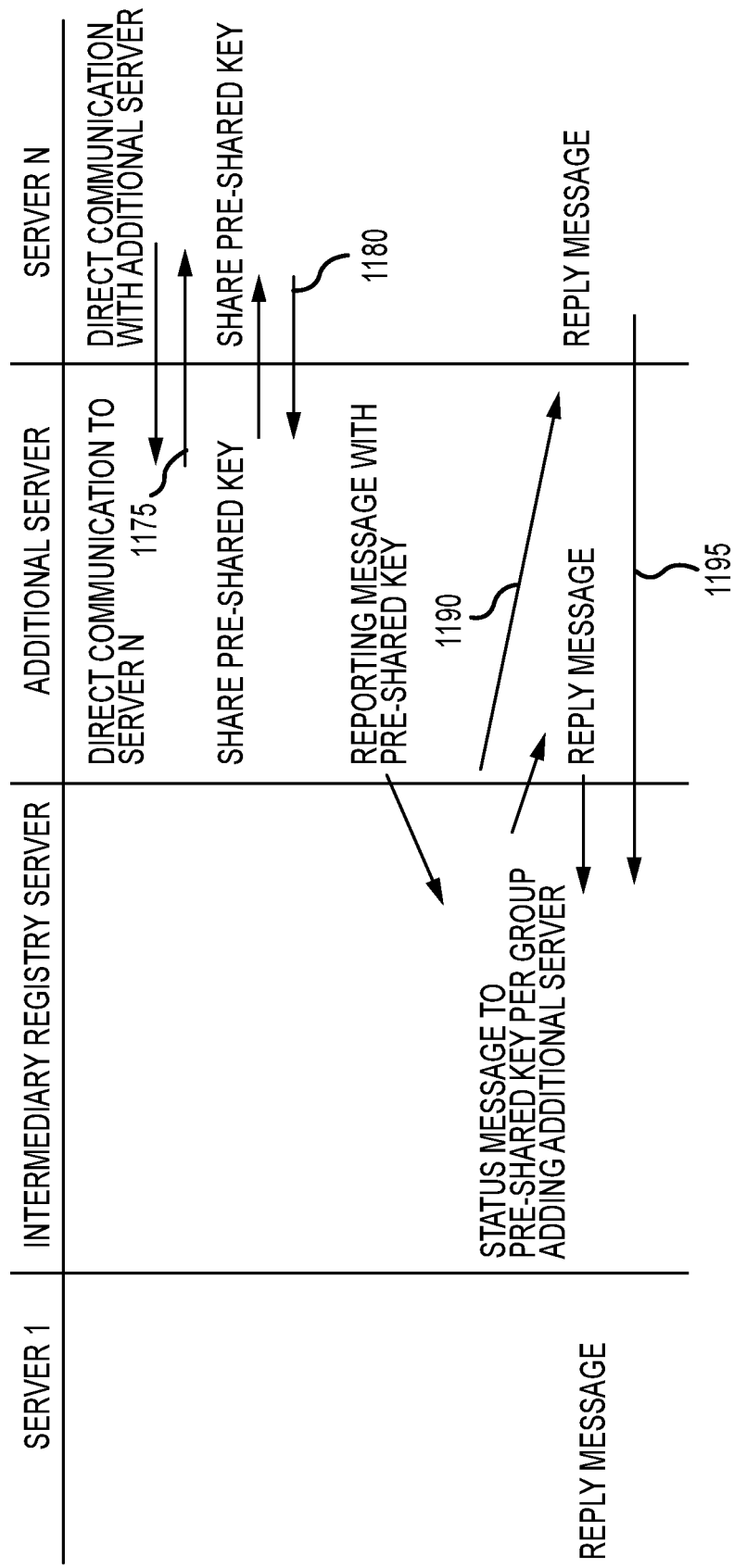
Figure 11:
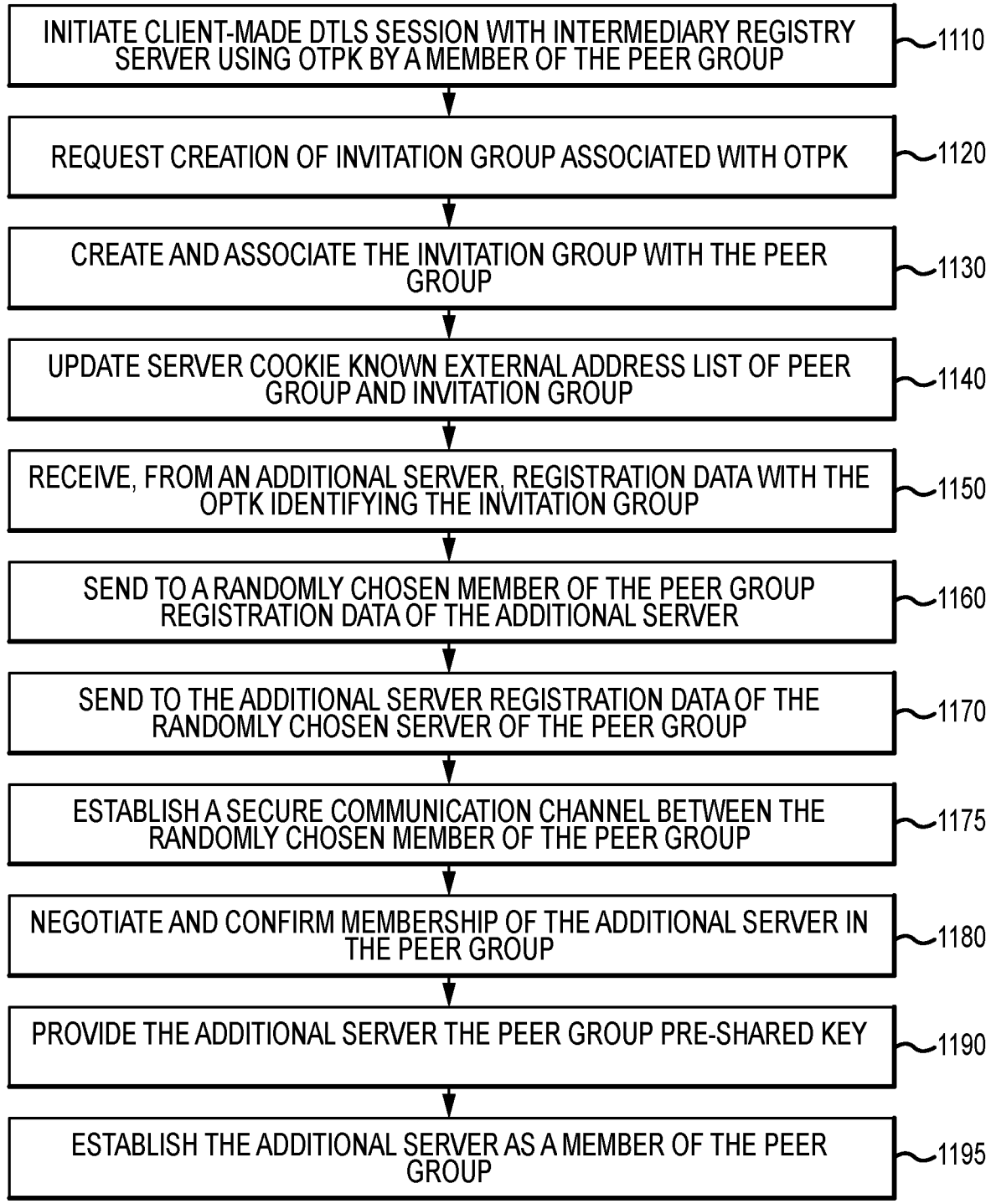
FIG. 11 is a flowchart of one method embodiment of the present invention for establishing an invitation group in an intermediary registry server and adding an additional server to an existing server cluster peer group.

The intermediary registry server also provides for the use case of creating new clusters and adding servers to existing clusters using the intermediary registry server. To do so, with additional reference to FIGS. 10 and 11, an invitation must first be established as described below.

1. The process begins with a client initiated DTLS session 1110 with the intermediary registry server using a OTPK.
   A client server of an existing group requests 1120 the creation of an invitation group associated with an OTPK.

The intermediary registry server thereafter creates 1130 and associated with invitation group with the existing peer group/cluster.

The existing cluster, or first server of a new cluster, may also register an optional secondary invitation cluster group with the intermediary registry server (described above in step 5)

The cluster group identity value of the invitation group is derived from a one-time secret key (OTPK), which is randomly generated by the server initiating the request. This OTPK is used to encrypt the blobs, and is shared with each new server to be added to the cluster.

2. To join a new server to an existing cluster using the intermediary registry server, the server to be joined (also referred to herein as an additional server) will create a DTLS association with the intermediary registry server, and send 1150 an RSVP message, including:

The cluster group identity of the target invitation group; and

An encrypted data blob, to be relayed to a member of the invitation cluster group chosen at random.

3. The intermediary registry server will respond by:

Choosing a registered member of the invitation cluster group at random;

Sending an invitation message 1160 to the chosen registered member, including the encrypted data blob sent by the requesting (additional) server; and Sending an invitation message to the requesting (additional) client 1170, including the encrypted data blob of the randomly chosen registered member, which was provided by the chosen registered member when that member last updated its group registration.

4. The chosen registered member and the new server may then communicate directly 1175. If either of the invite messages are lost, the initiator may re-send the RSVP message. Invitation messages are sent to both the initiator and the chosen registered member to support traversal of symmetric NAT routers and to negotiate membership in the peer group 1180.

5. The additional server is thereafter provided the peer group (original cluster) pre-shared key 1190 which enables the additional server to join 1195 the peer group as new member of the cluster.

Typically, when a network server component such as Cluster Monitor opens a

UDP socket to receive messages from its peers, it will bind the UDP socket to a well-known port associated with its protocol and use case. The use of a well-known port allows peers to know ahead of time on which port the service will be receiving messages, and allows network troubleshooting tools to quickly classify such traffic. When performing endpoint discovery, the port number of the UDP socket used by Cluster Monitor is discovered, and use of a well-known port is no longer needed. To support reliable endpoint discovery with NAT routers, the Cluster Monitor component may instead use a UDP socket bound to a pseudorandom port for communication with the intermediary registry server and outside servers of the cluster using endpoints discovered by the intermediary registry server process. Some NAT routers use the internal UDP source port of outgoing messages as the basis of the associated external endpoint address mapping, and if two servers behind the same NAT router attempt to communicate externally using the same well-known UDP port, the NAT router may choose unpredictable and inconsistent external endpoint mappings for each server. With a pseudorandom port, the Cluster Monitor component of the present invention on a specific server will choose the same port each time it is restarted, but Cluster Monitor components running on different servers will tend to choose different ports.

The present invention enables server cluster communication across the public internet using a single secure User Datagram Protocol (UDP) as facilitated by an intermediary registry server. The intermediary registry server enables servers within a cluster to identify and securely communicate with peer servers in the cluster across disparate locations and through firewalls Using an external address registry shared to each member of a server cluster peer group, individual servers can establish a direct secure channel using a single UDP tunnel.

It will also be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the claims.

In a preferred embodiment, the present invention can be implemented in software. Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. Moreover, those skilled in the art will appreciate that the invention can be practiced with other computer system configurations, multi-processor systems, microprocessor-based or programmable consumer electronics, network PCs, minicomputers, mainframe computers, and the like. The invention is preferably practiced in distributed computing environments where tasks are performed by remote processing devices that are linked through a communications network. In a distributed computing environment, program modules may be located in both local and remote memory storage devices.

An exemplary system for implementing the invention includes a general purpose computing device such as the form of a conventional computer, a personal communication device or the like, including a processing unit, a system memory, and a system bus that couples various system components, including the system memory to the processing unit. The system bus may be any of several types of bus structures including a memory bus or memory controller, a peripheral bus, and a local bus using any of a variety of bus architectures. The system memory generally includes read-only memory (ROM) and random access memory (RAM). A basic input/output system (BIOS), containing the basic routines that help to transfer information between elements within the personal computer, such as during start-up, is stored in ROM. The computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-transitory non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer may also be used in the exemplary operating environment.

While there have been described above the principles of the present invention in conjunction an intermediary registry server configured to enable direct UDP DLTS communication over the public Internet so support distributed server cluster operations, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A machine implemented method, comprising:
   establishing a secure connection between a server and an intermediary registry server through a User Datagram Protocol (UDP) external port forming a UDP channel and wherein the UDP channel is a single UDP channel, the server being in a peer group, the peer group based on a pre-shared key wherein each server in the peer group includes a cluster monitor and wherein one cluster monitor, independent of the intermediary registry, administers configuration details of the peer group;

sending, by a server in the peer group, a reporting message to the intermediary registry server using the UDP channel wherein the reporting message is associated with a UDP external endpoint instance of the server and a UDP internal endpoint instance of the server;

responding, by the intermediary registry server through the UDP channel to the server, seeking confirmation of the UDP external endpoint instance of the server;

responding, by the server, with confirmation of the UDP external endpoint instance of the server, and a cookie value logically associating redundant multiple secure connections with the server, the pre-shared key identifying the peer group, and registration data encrypted using the pre-shared key;

receiving, by intermediary registry server, confirmation of the UDP external endpoint instance of the server;

responsive to receiving confirmation from the server the UDP external endpoint instance of the server is active, recording without authenticating, by the intermediary registry server, a server identification, the UDP external endpoint instance of the server, and the UDP internal endpoint instance of the server in an external address registry of the peer group; and sending by the intermediary registry server, an external address registry status message to the server in the peer group confirming listing of the UDP channel of the server in the external address registry of the peer group and a list of other servers registered by the intermediary registry server in the peer group enabling direct secure communication between the server and other registered servers in the peer group.

2. The machine implemented method of claim 1, wherein the single UDP channel is configured to carry all data between servers.

3. The machine implemented method of claim 1, wherein the secure connection is a Datagram Transport Layer Security (DTLS) session.

4. The machine implemented method of claim 1, further comprising establishing additional secure connections between the server and the intermediary registry server wherein the intermediary registry server associates each additional secure connection as a logical connection with the server.

5. The machine implemented method of claim 1, wherein the list includes registration data of each registered server in the peer group enabling direct secure communication between registered servers in the peer group, the registration data selected from the group consisting of server identification, UDP channel, UDP external endpoint, and pre-shared key.

6. The machine implemented method of claim 5, wherein the external address registry status message includes membership status of each registered server in the peer group based on the pre-shared key and any changes to membership status of any server in the peer group.

7. The machine implemented method of claim 5 further comprising
receiving, by the intermediary registry server from the server, a request to create an invitation group wherein the invitation group is associated with a One-Time Private Key (OTPK), and
forming, by the intermediary registry server, the invitation group wherein each member of the peer group is associated with the invitation group.

8. The machine implemented method of claim 7, further comprising,
establishing, by the intermediary registry server, a new secure connection through a new UDP channel with an additional server,
receiving, from the additional server, registration data with the OTPK identifying the invitation group, and
sending, by the intermediary registry server to a randomly chosen member of the peer group, registration data from the additional server, and to the additional server, registration data of the randomly chosen member of the peer group.

9. The machine implemented method of claim 8, further comprising
establishing a secure communication channel between the randomly chosen member of the peer group and the additional server using the OTPK,
confirming membership of the additional server in the peer group,
providing, by the randomly chosen member of the peer group to the additional server, the pre-shared key, and
establishing the additional server as a member of the peer group.

10. The machine implemented method of claim 9, responsive to receiving by the intermediary registry server from the additional server a response, further comprising adding the additional server to the external address registry as a member of the peer group.

11. A non-transitory machine-readable storage medium having stored thereon instructions for performing a method, comprising machine executable code, which when executed by at least one machine, causes the machine to:
establish a secure connection between a server and an intermediary registry server through a User Datagram Protocol (UDP) external port forming a UDP channel and wherein the UDP channel is a single UDP channel, the server being in a peer group, the peer group based on a pre-shared key wherein each server in the peer group includes a cluster monitor and wherein one cluster monitor, independent of the intermediary registry, administers configuration details of the peer group;
send, by the server in a peer group, a reporting message to the intermediary registry server using the UDP channel wherein the reporting message is associated with a UDP external endpoint and a UDP internal endpoint;
respond, by the intermediary registry server through the UDP channel to the server, seeking confirmation of the UDP external endpoint of the server;
respond, by the server, with confirmation of the UDP external endpoint instance of the server, and a cookie value logically associating redundant multiple secure connections with the server, the pre-shared key identifying the peer group, and registration data encrypted using the pre-shared key;
receive, by intermediary registry server, confirmation of the UDP external endpoint of the server;
responsive to receiving confirmation from the server the UDP external endpoint of the server is active, record without authentication, by the intermediary registry server, a server identification, the UDP external endpoint of the server and the UDP internal endpoint of the server in an external address registry of the peer group; and
send, by the intermediary registry server, an external address registry status message to the server in the peer group confirming listing of the UDP channel of the server in the external address registry of the peer group and a list of other servers registered by the intermediary registry server in the peer group enabling direct secure communication between the server and other servers in the peer group enabling direct secure communication between the server and other registered servers in the peer group.

12. The non-transitory machine-readable storage medium of claim 11, further comprising machine executable code which causes the machine to establish a secure connection between the server and the intermediary registry server through the UDP external endpoint.

13. The non-transitory machine-readable storage medium of claim 12, wherein the secure connection is a Datagram Transport Layer Security (DTLS) session.

14. The non-transitory machine-readable storage medium of claim 12, further comprising machine executable code which causes the machine to establish additional secure connections between the server and the intermediary registry server wherein the intermediary registry server associates each additional secure connection as a logical connection with the server.

15. The non-transitory machine-readable storage medium of claim 12, further comprising machine executable code which causes the machine to respond, by the server, with only a cookie value to logically associate multiple secure connections with the server, the pre-shared key identifying the peer group, and registration data encrypted using the pre-shared key.

16. The non-transitory machine-readable storage medium of claim 15, wherein the list includes registration data of each server in the peer group enabling direct communication between registered servers, the registration data selected from the group consisting of server name, UDP external endpoint, UDP internal endpoint, and pre-shared key.

17. The non-transitory machine-readable storage medium of claim 16, wherein the external address registry status message includes membership status of each server in the peer group based on the pre-shared key and any changes to membership status of any server in the peer group.

18. The non-transitory machine-readable storage medium of claim 16, further comprising machine executable code which causes the machine to,
receive, by the intermediary registry server from the server, a request to create an invitation group wherein the invitation group is associated with a One-Time Private Key (OTPK), and
form, by the intermediary registry server, the invitation group wherein each member of the peer group is associated with the invitation group.

19. The non-transitory machine-readable storage medium of claim 18, further comprising machine executable code which causes the machine to,
establish, by the intermediary registry server, a new secure connection through a new UDP channel with an additional server, receive, from the additional server, registration data with the OTPK identifying the invitation group, and send, by the intermediary registry server to a randomly chosen member of the peer group, registration data from the additional server, and to the additional server, registration data of the randomly chosen member of the peer group.

20. The non-transitory machine-readable storage medium of claim 19, further comprising machine executable code which causes the machine to, establish a secure communication channel between the randomly chosen member of the peer group and the additional server using the OTPK, provide, by the randomly chosen member of the peer group to the additional server, the pre-shared key, and establish the additional server as a member of the peer group.

21. The non-transitory machine-readable storage medium of claim 20, responsive to receiving by the intermediary registry server from the additional server a response, further comprising machine executable code which causes the machine to add the additional server to the external address registry as a member of the peer group.

22. A computer system for communication between servers within a peer group of servers over a public wide area network, the computer system comprising:

a machine capable of executing instructions embodied as software; and a plurality of software portions resident on a non-transitory storage media, wherein one of said software portions is configured to establish a secure connection between a server and an intermediary registry server through a User Datagram Protocol (UDP) external port forming a UDP channel and wherein the UDP channel is a single UDP channel, the server being in a peer group, the peer group based on a pre-shared key wherein each server in the peer group includes a cluster monitor and wherein one cluster monitor, independent of the intermediary registry, administers configuration details of the peer group;

send, by the server, a reporting message to the intermediary registry server using the UDP channel wherein the reporting message is associated with a UDP external endpoint and a UDP internal endpoint, respond, by the intermediary registry server through the UDP channel to the server, seeking confirmation of the UDP external endpoint of the server, respond, by the server, with confirmation of the UDP external endpoint instance of the server, and a cookie value logically associating redundant multiple secure connections with the server, the pre-shared key identifying the peer group, and registration data encrypted using the pre-shared key;

receive, by intermediary registry server, confirmation of the UDP external endpoint of the server, responsive to receiving confirmation from the server the UDP external endpoint of the server is active, record without authenticating, by the intermediary registry server, a server identification, the UDP external endpoint of the server and the UDP internal endpoint of the server in an external address registry of the peer group; and send, by the intermediary registry server, an external address registry status message to the server in the peer group confirming listing of the UDP channel of the server in the external address registry of the peer group and a list of other servers registered by the intermediary registry server in the peer group enabling direct secure communication between the server and other registered servers in the peer group.

* * * * *